(12) United States Patent
Kang et al.

(10) Patent No.: US 12,405,721 B2
(45) Date of Patent: Sep. 2, 2025

(54) ELECTRONIC DEVICE FOR CONTROLLING ATTRIBUTES OF ONE-HANDED MODE SCREEN ON BASIS OF GRIP SHAPE AND METHOD FOR CONTROLLING SAME

(71) Applicant: Samsung Electronics Co., Ltd., Suwon-si (KR)

(72) Inventors: Jooyoung Kang, Suwon-si (KR); Hyunggwang Kang, Suwon-si (KR); Moonsun Kim, Suwon-si (KR); Soohyun Seo, Suwon-si (KR); Jihyung Jung, Suwon-si (KR); Hojin Jung, Suwon-si (KR); Hyoungtak Cho, Suwon-si (KR); Soyoung Lee, Suwon-si (KR); Junghyeob Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/811,195

(22) Filed: Aug. 21, 2024

(65) Prior Publication Data
US 2024/0411445 A1    Dec. 12, 2024

Related U.S. Application Data

(63) Continuation of application No. PCT/KR2023/004214, filed on Mar. 29, 2023.

(30) Foreign Application Priority Data

Apr. 8, 2022   (KR) .................. 10-2022-0043869
Aug. 18, 2022  (KR) .................. 10-2022-0103172

(51) Int. Cl.
G09G 5/00      (2006.01)
G06F 1/16      (2006.01)
G06F 3/0487    (2013.01)

(52) U.S. Cl.
CPC .......... G06F 3/0487 (2013.01); G06F 1/1652 (2013.01)

(58) Field of Classification Search
CPC ...... G09F 9/301; G06F 1/1624; G06F 1/1652; G06F 3/0482; G06F 3/0484;
(Continued)

(56) References Cited

U.S. PATENT DOCUMENTS 9,864,504 B2   1/2018  Park et al.
10,326,872 B2  6/2019  Jung et al.
(Continued)

FOREIGN PATENT DOCUMENTS

CN   113741778 A   12/2021
CN   113746961 A   12/2021
(Continued)

OTHER PUBLICATIONS

Extended European Search Report dated Jun. 3, 2024, issued in European Application No. 23714464.7-1218.
(Continued)

*Primary Examiner* — Joe H Cheng
(74) *Attorney, Agent, or Firm* — Jefferson IP Law, LLP

(57) ABSTRACT

Disclosed are an electronic device for controlling attributes of one-handed mode screen on the basis of a grip shape and a method for controlling same. An electronic device according to an embodiment of the present document may be configured to display, on a flexible display, a one-handed mode screen which is reduced and displayed according to a predetermined ratio so as to correspond to a first screen, detect, while the one-handed mode screen is displayed, that a first housing is moved, and determine, on the basis of the detection of the movement of the first housing, the direction of expansion of the one-handed mode screen depending on whether a grip of a portion of a user's body on the top
(Continued)

portion of the first housing is sensed by a first grip sensor, among grip sensors, which is disposed on the edge of the first housing.

15 Claims, 22 Drawing Sheets

(58) Field of Classification Search
CPC .. G06F 3/04845; G06F 3/0487; G06F 3/0488;
G06F 3/04883; G06F 3/04886; H04M
1/0235; H04M 1/0237; H04M 1/0241;
H04M 1/0245; H04M 1/0281; H04M
1/72454
See application file for complete search history.

(56) References Cited

U.S. PATENT DOCUMENTS

| | | | |
|---|---|---|---|
| 11,366,584 | B2 | 6/2022 | Chung et al. |
| 11,595,505 | B2 * | 2/2023 | Noh ................. H04M 1/0241 |
| 11,940,842 | B2 * | 3/2024 | Kang ..................... G06F 1/16 |
| 2013/0237288 | A1 | 9/2013 | Lee |
| 2019/0346954 | A1 * | 11/2019 | Jung ................. G06F 3/0416 |
| 2021/0166651 | A1 | 6/2021 | Shim et al. |
| 2021/0397264 | A1 | 12/2021 | Jain et al. |
| 2023/0130358 | A1 | 4/2023 | Choi et al. |
| 2023/0171708 | A1 | 6/2023 | Choi et al. |
| 2023/0195400 | A1 | 6/2023 | Woo et al. |
| 2023/0205417 | A1 | 6/2023 | Yang et al. |

FOREIGN PATENT DOCUMENTS

| | | |
|---|---|---|
| EP | 3 905 021 A1 | 11/2021 |
| KR | 10-1718026 B1 | 4/2017 |
| KR | 10-1977075 B1 | 5/2019 |
| KR | 10-2262962 B1 | 6/2021 |
| KR | 10-2022-0008739 A | 1/2022 |
| KR | 10-2022-0013786 A | 2/2022 |
| KR | 10-2022-0020017 A | 2/2022 |

OTHER PUBLICATIONS

International Search Report dated Jul. 3, 2023, issued in International Patent Application No. PCT/KR2023/004214.

* cited by examiner (a)

(b)

ELECTRONIC DEVICE FOR CONTROLLING ATTRIBUTES OF ONE-HANDED MODE SCREEN ON BASIS OF GRIP SHAPE AND METHOD FOR CONTROLLING SAME

CROSS-REFERENCE TO RELATED APPLICATION(S)

This application is a continuation application, claiming priority under § 365 (c), of International Application No. PCT/KR2023/004214, filed on Mar. 29, 2023, which is based on and claims the benefit of a Korean patent application number 10-2022-0043869, filed on Apr. 8, 2022, in the Korean Intellectual Property Office, and of a Korean patent application number 10-2022-0103172, filed on Aug. 18, 2022, in the Korean Intellectual Property Office, the disclosures of each of which is incorporated by reference herein in its entirety.

BACKGROUND

1. Field

The disclosure relates to an electronic device for controlling, based on a grip type, properties of a one-handed mode screen, and a method for controlling the same.

2. Description of Related Art

Various services and additional functions provided through an electronic device, for example, a portable electronic device such as a smartphone, are gradually increasing. In order to increase the utility value of such electronic device and satisfy the needs of various users, communication service providers or electronic device manufacturers are competitively developing electronic devices which provide various functions and differentiate the communication service providers or the electronic device manufacturers from other companies. Accordingly, various functions provided through the electronic device are also increasingly advanced.

SUMMARY

A user of an electronic device (e.g., a smartphone) may use one hand to control (e.g., touch) a screen in which the size of a screen (e.g., a home screen) being displayed on the electronic device is reduced by a designated ratio. Herein, for convenience of description, such a function or operation may be referred to as "one-handed manipulation mode" or "one-handed keyboard mode". When the "one-handed manipulation mode" or the "one-handed keyboard mode" is used, the screen having a size reduced according to the designated ratio may be displayed at a position in which the one-handed manipulation mode was last used. Therefore, if the one-handed mode is executed in the opposite direction to the position of the hand gripping the electronic device (e.g., when the screen reduced in size according to the designated ratio is displayed), the user may experience the inconvenience of having to re-position the screen. In addition, when a housing slides (e.g., the electronic device is switched from a closed state to an opened state) while a one-handed manipulation mode is used in an electronic device in which a flexible display is extended in the vertical direction, a one-handed manipulation mode screen (simply, a "one-handed mode screen") that is currently displayed on the electronic device may be extended and displayed toward an upper end by the sliding. In this case, a portion extended to the upper end may be displayed in a position in which it is difficult for the user to control the portion in the one-handed manipulation mode. Therefore, in order to continuously use the one-handed manipulation mode, a user setting for adjusting the display position of the one-handed mode screen may be required, which may make the user feel uncomfortable.

An embodiment herein provides an electronic device wherein when the electronic device is switched from a closed state to an opened state, properties of a one-handed mode screen may be controlled (e.g., the extension direction of the one-handed mode screen may be determined) according to the state of a user's grip on the electronic device, thereby reducing the user's inconvenience in the use of a one-handed manipulation mode.

An embodiment herein provides a method for controlling an electronic device, wherein when the electronic device is switched from a closed state to an opened state, properties of a one-handed mode screen may be controlled (e.g., the extension direction of the one-handed mode screen may be determined) according to the state of a user's grip on the electronic device, thereby reducing the user's inconvenience in the use of a one-handed manipulation mode.

However, the problems to be solved in the disclosure are not limited to the above-mentioned problems, and may be variously expanded without departing from the spirit and scope of the disclosure.

An electronic device according to an embodiment herein may include a first housing, a second housing disposed to be movable with respect to the first housing, at least one processor disposed in the second housing, and grip sensors disposed at edges of the first housing and the second housing, respectively, and a flexible display at least partially mounted on the surface of the second housing and at least partially exposed to the outside of the electronic device, wherein a portion of the flexible display is inserted into or withdrawn from the first housing by sliding of the first housing, and the at least one processor is configured to display, on the flexible display, a one-handed mode screen that is reduced and displayed according to a predetermined ratio corresponding to a first screen, detect that the second housing is moved while the one-handed mode screen is displayed, and determine, based on the detection of the movement of the second housing, the extension direction of the one-handed mode screen according to whether a first grip sensor disposed at the edge of the first housing among the grip sensors senses that a user's body portion grips an upper end of the first housing.

A method for controlling an electronic device, according to an embodiment herein, may include displaying, on the flexible display, a one-handed mode screen that is reduced according to a predetermined ratio corresponding to a first screen and displayed, detecting that the second housing is moved while the one-handed mode screen is displayed, and determining, based on the detection of the movement of the second housing, the extension direction of the one-handed mode screen according to whether a first grip sensor disposed at the edge of the first housing among the grip sensors senses that a user's body portion grips an upper end of the first housing.

An embodiment herein provides an electronic device wherein when the electronic device is switched from a closed state to an opened state, properties of a one-handed mode screen may be controlled (e.g., the extension direction of the one-handed mode screen may be determined) according to the state of a user's grip on the electronic device, thereby reducing the user's inconvenience in the use of a one-handed manipulation mode.

Effects according to various embodiments herein are not limited to the above-described effects, and it is apparent to those skilled in the art that various effects are inherent in the disclosure

DETAILED DESCRIPTION

Figure 1:
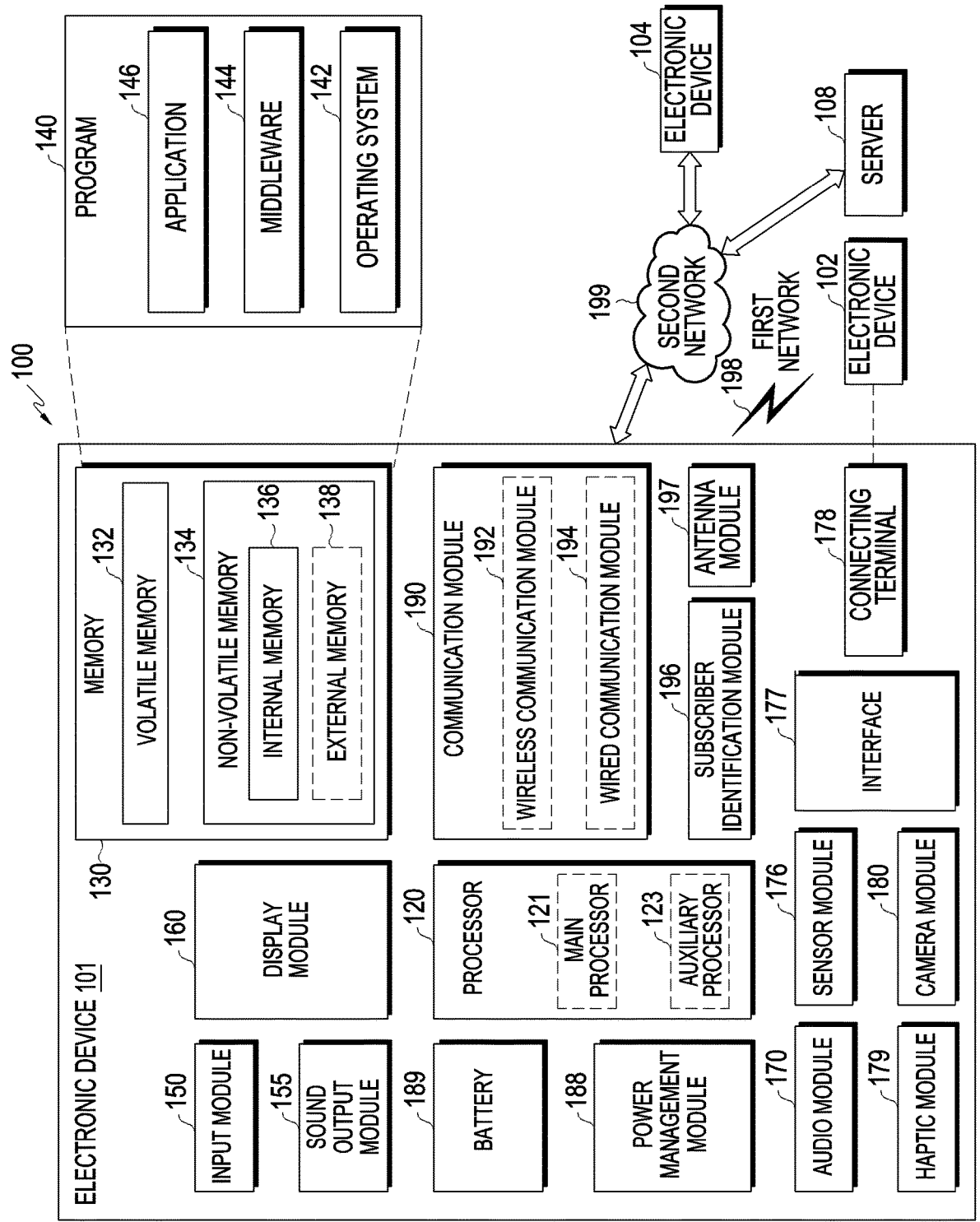
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mm Wave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
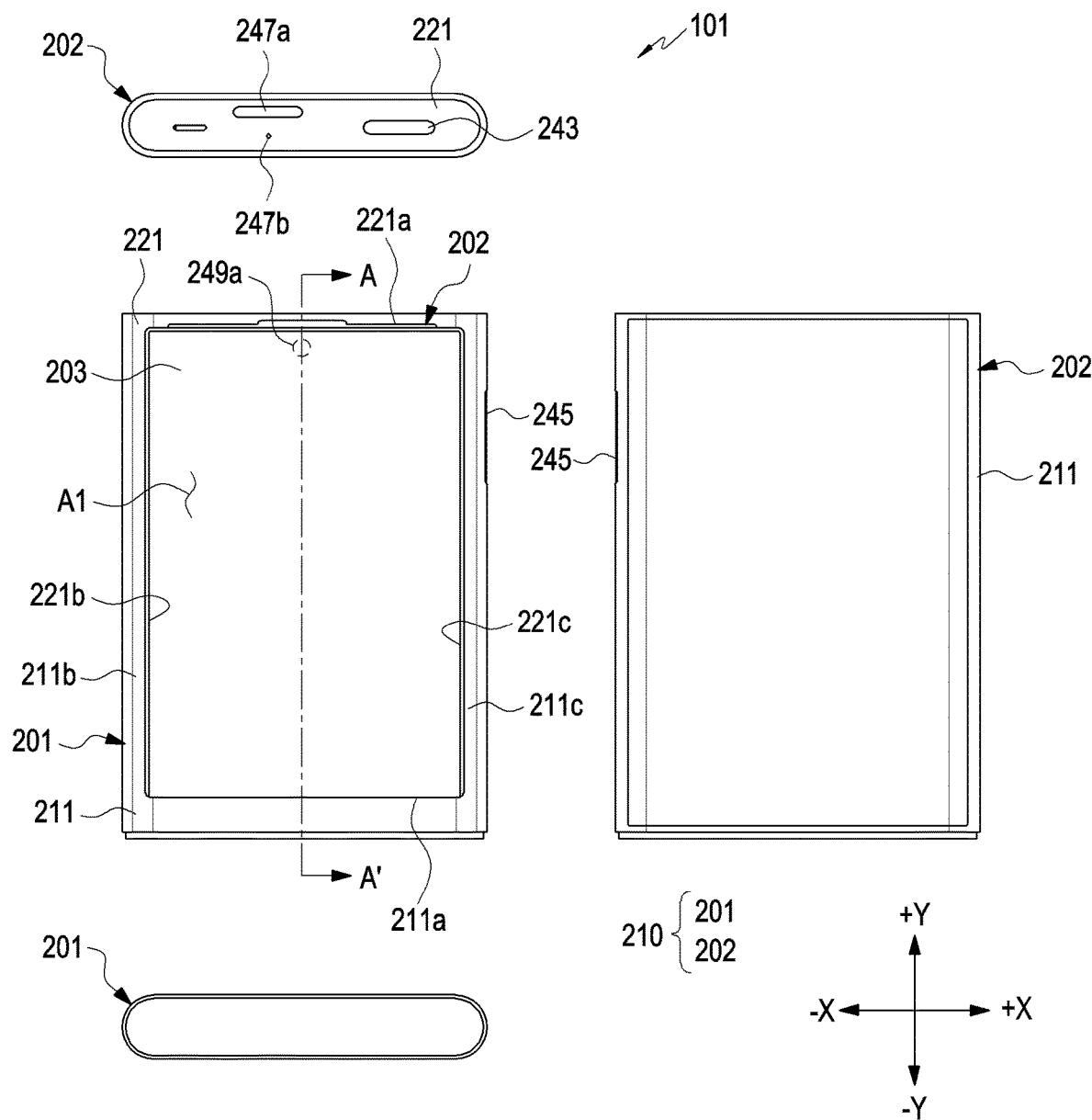
FIG. 2 illustrates a state in which a second display area of a display according to various embodiments herein is accommodated in a housing.
Figure 3:
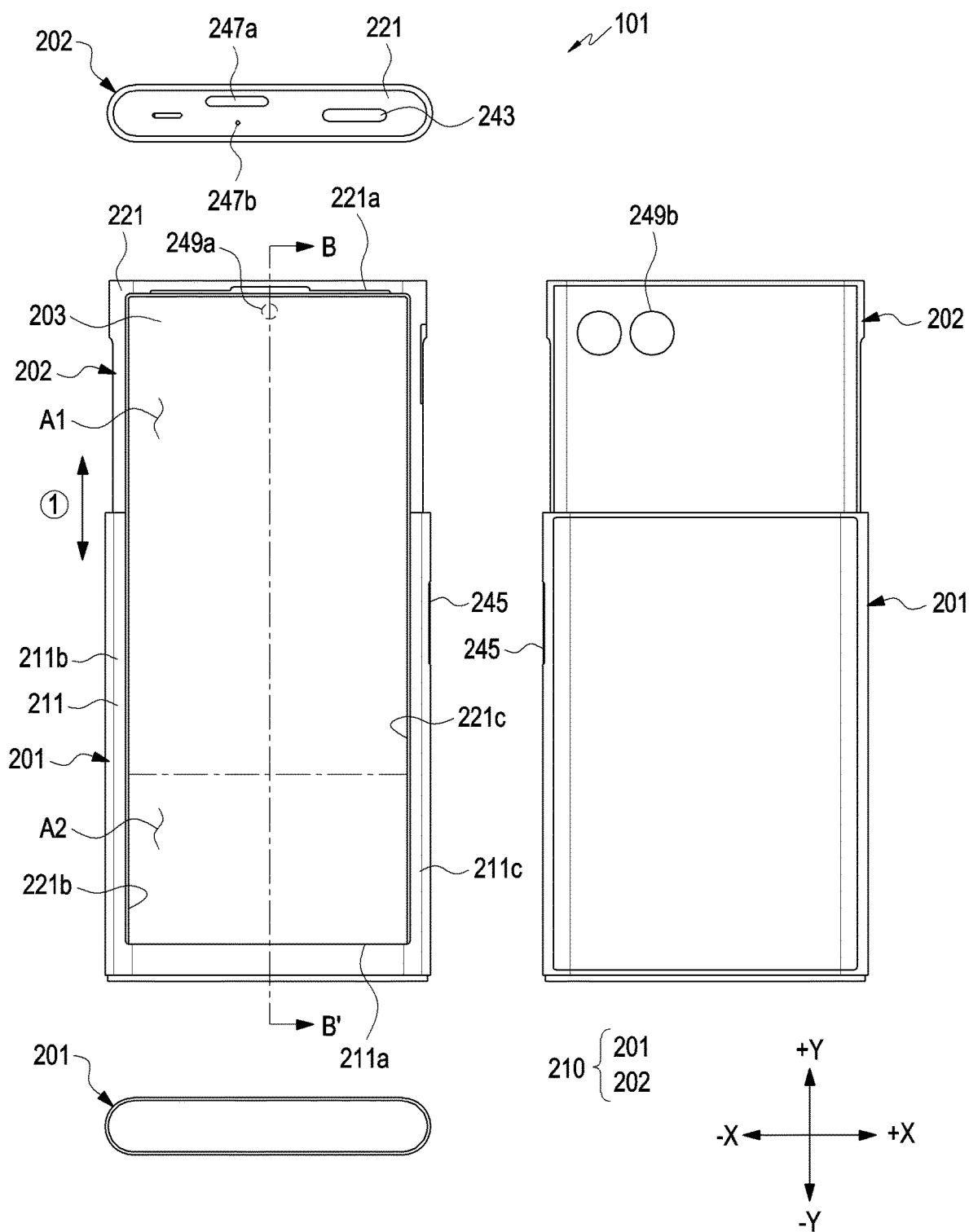
FIG. 3 illustrates a state in which the second display area of the display according to various embodiments herein is exposed to the outside of the housing.

FIG. 2 illustrates a state in which a second display area of a display according to various embodiments herein is accommodated in a housing. FIG. 3 illustrates a state in which the second display area of the display according to various embodiments herein is exposed to the outside of the housing.

FIGS. 2 and 3 show a structure in which a display 203 (e.g., a flexible display or a rollable display) is extended in the longitudinal direction (e.g., the +Y direction) when viewed from the front of an electronic device 101. However, the extension direction of the display 203 is not limited to one direction (e.g., the +Y direction). For example, the extension direction of the display 203 can be designed/changed such that the display 203 is extendable in the upward direction (+Y direction), the rightward direction (e.g., the +X direction), the leftward direction (e.g., the −X direction), and/or the downward direction (e.g., the −Y direction)

The state illustrated in FIG. 2 may be referred to as a closed state of the electronic device 101 or a housing 210 and a slide-in state of the display 203.

The state illustrated in FIG. 3 may be referred to as an opened state of the electronic device 101 or the housing 210, and a slide-out state of the display 203.

Referring to FIGS. 2 and 3, the electronic device 101 may include the housing 210. The housing 210 may include a first housing 201 and a second housing 202 movably disposed relative to the first housing 201. In an embodiment, it may be construed that the electronic device 101 has a structure in which the first housing 201 is disposed to be slidable with respect to the second housing 202. According to one embodiment, the second housing 202 may be arranged to reciprocate a predetermined distance in an illustrated direction with respect to the first housing 201, for example, a direction indicated by arrow ①.

According to various embodiments, the second housing 202 may be referred to as a slide unit or a slide housing, and may be movable relative to the first housing 201. According to one embodiment, the second housing 202 may accommodate various electrical and electronic components such as a circuit board or a battery.

According to one embodiment, a motor, a speaker, a sim socket, and/or a sub circuit board electrically connected to a main circuit board (e.g., a second circuit board 249 in FIG. 4) may be disposed in the first housing 201. The second housing 202 may accommodate the main circuit board (e.g., the first circuit board 248 in FIG. 4) on which electrical components such as an application processor (AP) and a communication processor (CP) are mounted.

According to various embodiments, the first housing 201 may include a first cover member 211 (e.g., a main case). The first cover member 211 may include a (1-1)th side wall 211a, a (1-2)th side wall 211b extending from the (1-1)th side wall 211a, and a (1-3)th side wall 211c extending from the (1-1)th side wall 211a and substantially parallel to the (1-2)th side wall 211b. According to an embodiment, the (1-2)th side wall 211b and the (1-3)th side wall 211c may be formed substantially perpendicular to the (1-1)th side wall 211a.

According to various embodiments, the (1-1)th side wall 211a, the (1-2)th side wall 211b, and the (1-3)th side wall 211c of the first cover member 211 may be formed in a shape in which one side (e.g., a front face) is open so as to accommodate (or surround) at least a portion of the second housing 202. For example, at least a portion of the second housing 202 may be surrounded by the first housing 201, and may slide in a direction parallel to a first surface (e.g., the first surface F1 in FIG. 4), for example, in the direction of arrow ①, while being guided by the first housing 201. According to an embodiment, the (1-1)th side wall 211a, the (1-2)th side wall 211b, and/or the (1-3)th side wall 211c of the first cover member 211 may be integrally formed. According to another embodiment, the (1-1)th side wall 211a, the (1-2)th side wall 211b, and/or the (1-3)th side wall 211c of the first cover member 211 may be formed as separate structures to be coupled or assembled.

According to various embodiments, the first cover member 211 may be formed to surround at least a portion of the display 203. For example, at least a portion of the display 203 may be formed to be surrounded by the (1-1)th side wall 211a, the (1-2)th side wall 211b, and/or the (1-3)th side of the first cover member 211.

According to various embodiments, the second housing 202 may include a second cover member 221 (e.g., a slide plate). The second cover member 221 may have a plate shape, and may include a first surface (e.g., the first surface F1 in FIG. 4) for supporting internal components. For example, the second cover member 221 may support at least a portion (e.g., a first display area A1) of the display 203. According to an embodiment, the second cover member 221 may be referred to as a front cover.

According to one embodiment, the second cover member 221 may include a (2-1)th side wall 221a, a (2-2)th side wall 221b extending from the (2-1)th side wall 221a, and a (2-3)th side wall 221c extending from the (2-1)th side wall 221a and substantially parallel to the (2-2)th side wall 221b. According to an embodiment, the (2-2)th side wall 221b and the (2-3)th side wall 221c may be formed substantially perpendicular to the (2-1)th side wall 221a.

According to various embodiments, the second housing 202 may form an opened state and a closed state of the housing 210 by moving in a first direction (e.g., direction ① parallel to the (1-2)th side wall 211b or the (1-3)th side wall 211c. In the closed state, the second housing 202 may move to be positioned at a first distance from the (1-1)th side wall 211a, and in the opened state, the second housing 202 may move to be positioned at a second distance greater than at a first distance from the (1-1)th side wall 211a. In an embodiment, in the closed state, the first housing 201 may surround a portion of the (2-1)th side wall 221a.

According to various embodiments, the electronic device 101 may include the display 203, a key input device 245, a connector hole 243, audio modules 247a and 247b, or camera modules 249a and 249b. According to an embodiment, the electronic device 101 may further include an indicator (e.g., an LED device) or various sensor modules.

According to various embodiments, the display 203 may include a first display area A1 and a second display area A2 configured to be exposed to the outside of the electronic device 101 based on sliding of the second housing 202. According to an embodiment, the first display area A1 may be disposed on the second housing 202. For example, the first display area A1 may be disposed on the second cover member 221 of the second housing 202. According to an embodiment, the second display area A2 may extend from the first display area A1, and may be accommodated in the first housing 201 (e.g., in a slide-in state) or visually exposed to the outside of the electronic device 101 (e.g., in a slide-out state) depending on sliding of the second housing 202 relative to the first housing 201.

According to various embodiments, the second display area A2 may be moved while being substantially guided by one area (e.g., a curved surface 213a in FIG. 4) of the first housing 201, and may be accommodated in the inner space of the first housing 201 or exposed to the outside of the electronic device 101. According to an embodiment, the second display area A2 may be moved based on the sliding of the second housing 202 in the first direction (e.g., the direction indicated by arrow (1)). For example, while the second housing 202 slides, a portion of the second display area A2 may be deformed into a curved shape at a position corresponding to the curved surface 213a of the first housing 201.

According to various embodiments, when viewed from above the second cover member 221 (e.g., the front cover), if the housing 210 is switched from a closed state to an opened state (e.g., if the second housing 202 slides to extend from the first housing 201), the second display area A2 may be gradually exposed to the outside of the first housing 201 to form a substantially flat surface with the first display area A1. According to an embodiment, the display 203 may be coupled to or disposed adjacent to a touch sensing circuit, a pressure sensor capable of measuring the intensity (pressure) of a touch, and/or a digitizer for detecting a magnetic field-type stylus pen. According to an embodiment, regardless of the closed state or the opened state of the housing 210, the exposed portion of the second display area A2 may be positioned on a portion (e.g., curved surface 213a in FIG. 4) of the first housing. In addition, a portion of the second display area A2 at a position corresponding to the curved surface 213a may maintain a curved shape.

According to various embodiments, the key input device 245 may be positioned in one area of the first housing 201. Depending on the appearance and usage state, the electronic device 101 may be designed such that the illustrated key input device 245 is omitted or an additional key input device (additional key input devices) is (are) included. According to an embodiment, the electronic device 101 may include an unillustrated key input device, for example, a home key button or a touch pad disposed around the home key button. According to an embodiment, at least a portion of the key input device 245 may be disposed on the (1-1)th side wall 211a, the (1-2)th side wall 211b, and/or the (1-3)th side wall 211c of the first housing 201.

According to various embodiments, the connector hole 243 may be omitted according to embodiments, and may accommodate a connector (e.g., a USB connector) for transmitting/receiving power and/or data to and from an external electronic device. According to an embodiment (not shown), the electronic device 101 may include multiple connector holes 243, and some of the multiple connector holes 243 may function as connector holes for transmitting and receiving audio signals to and from an external electronic device. In the illustrated embodiment, the connector hole 243 is positioned in the second housing 202. However, the disclosure is not limited thereto, and the connector hole 243 or an unillustrated connector hole may be positioned in the first housing 201.

According to various embodiments, the audio modules 247a and 247b may include at least one speaker hole 247a, or at least one microphone hole 247b. One of the speaker holes 247a may be provided as a receiver hole for a voice call, and the other may be provided as an external speaker hole. The electronic device 101 may include a microphone for acquiring a sound, and the microphone may acquire a sound outside the electronic device 101 through the microphone hole 247b. According to an embodiment, the electronic device 101 may include multiple microphones to detect the direction of sound. According to an embodiment, the electronic device 101 may include an audio module in which the speaker hole 247a and the microphone hole 247b are implemented as one hole, or may include a speaker without the speaker hole 247a (e.g., a piezo speaker).

Figure 5A:
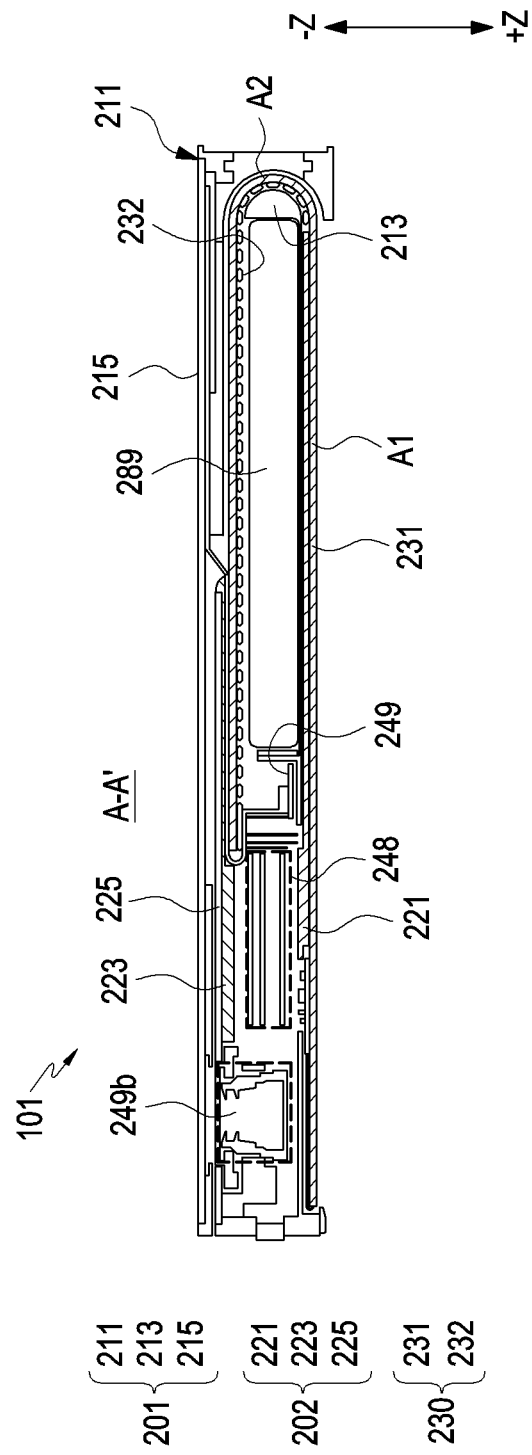
FIG. 5A is a cross-sectional view taken along line A-A' in FIG. 2 according to various embodiments herein.
Figure 5B:
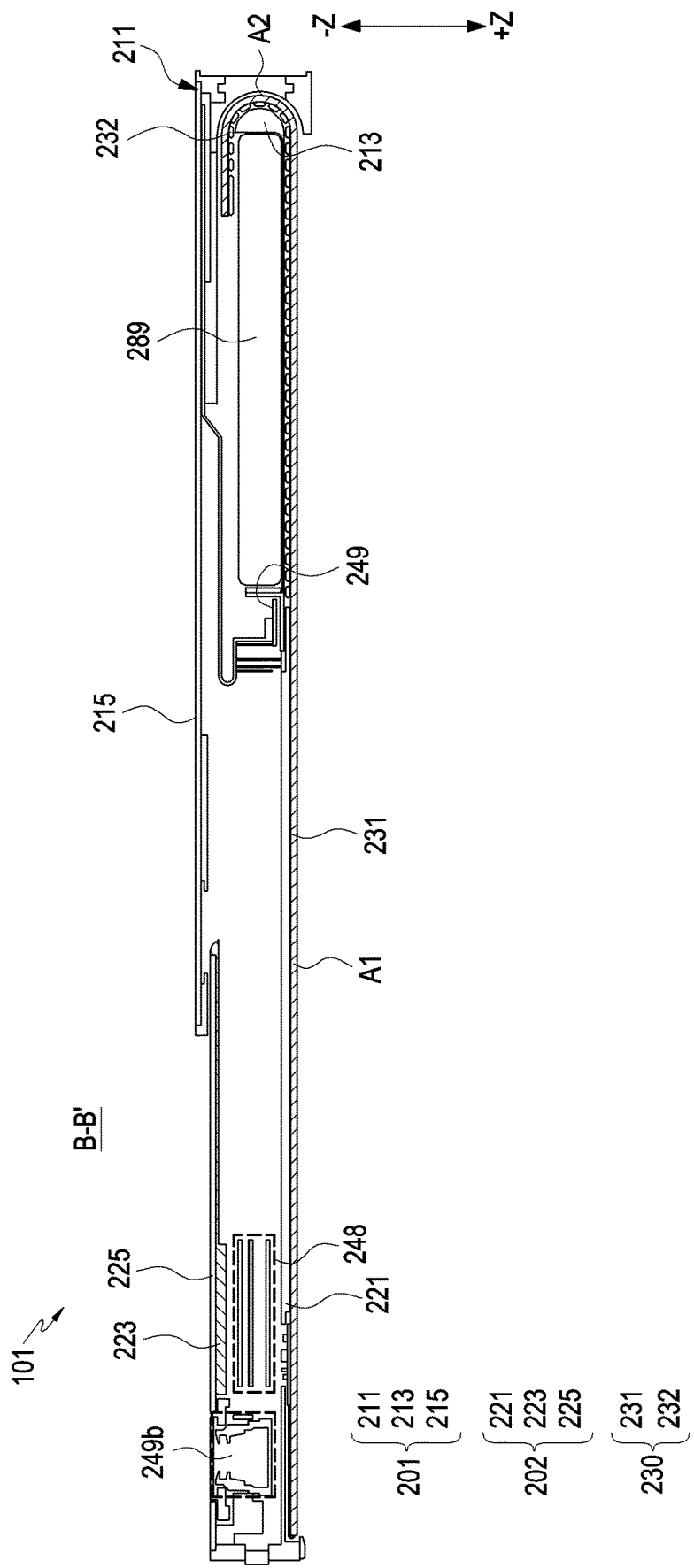
FIG. 5B is a cross-sectional view taken along line B-B' in FIG. 3 according to various embodiments herein.

According to various embodiments, the camera modules 249a and 249b may include a first camera module 249a (e.g., a front camera) and a second camera module 249b (e.g., a rear camera) (e.g., a second camera module 249b in FIGS. 5A and 5B). According to an embodiment, the electronic device 101 may include at least one of a wide-angle camera, a telephoto camera, or a close-up camera, and according to an embodiment, may include an infrared projector and/or an infrared receiver to measure a distance to a subject. The camera modules 249a and 249b may include one or multiple lenses, an image sensor, and/or an image signal processor. The first camera module 249a may be disposed to face the same direction as the display 203. For example, the first camera module 249a may be disposed on the periphery of the first display area A1 or in an area overlapping the display 203, and when disposed in the area overlapping with the display 203, may capture an image of a subject through the display 203. According to an embodiment, the first camera module 249a may not be visually exposed to a screen display area (e.g., the first display area A1), and may include a hidden under-display camera (UDC). According to an embodiment, the second camera module 249b may capture an image of a subject in a direction opposite to the first display area A1. According to an embodiment, the first camera module 249a and/or the second camera module 249b may be disposed on the second housing 202.

According to various embodiments, the indicator (not shown) of the electronic device 101 may be disposed in the first housing 201 or the second housing 202, and may include a light-emitting diode to provide state information of the electronic device 101 as a visual signal. The sensor module (not shown) of the electronic device 101 may generate an electrical signal or data value corresponding to an internal operation state of the electronic device 101 or an external environmental state. The sensor module may include, for example, a proximity sensor, a fingerprint sensor, or a biometric sensor (e.g., iris/face recognition sensor, or an HRM sensor). In another embodiment, the sensor module may include at least one of, for example, a gesture sensor, a gyro sensor, a barometric pressure sensor, a magnetic sensor, an acceleration sensor, a grip sensor, a color sensor, an infrared (IR) sensor, a temperature sensor, a humidity sensor, or an illuminance sensor.

Figure 4:
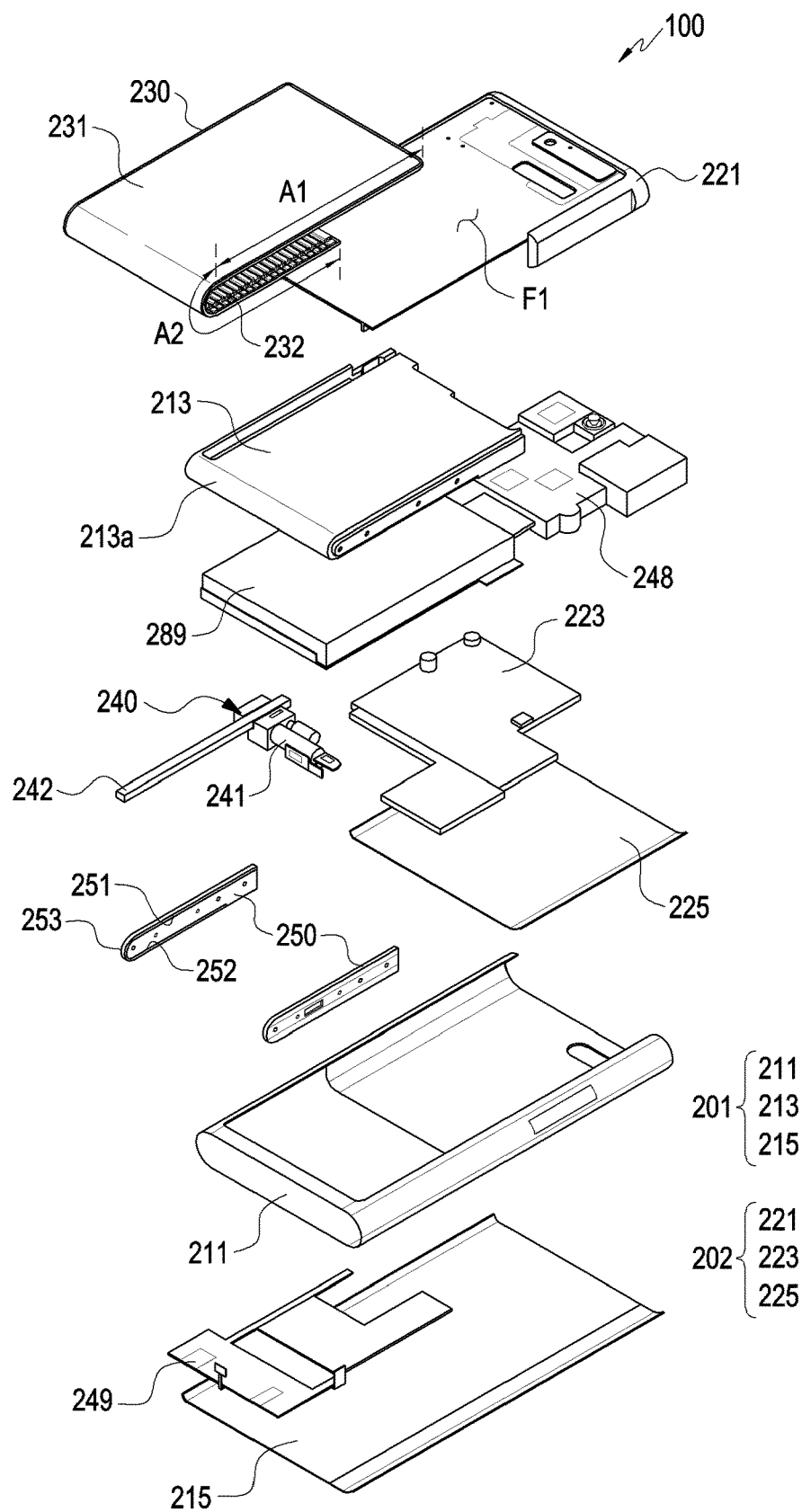
FIG. 4 is an exploded perspective view of an electronic device according to various embodiments herein.

FIG. 4 is an exploded perspective view of an electronic device according to various embodiments of the disclosure.

FIG. 5A is a cross-sectional view taken along line A-A' in FIG. 2 according to various embodiments of the disclosure.

FIG. 5B is a cross-sectional view taken along line B-B' in FIG. 3 according to various embodiments of the disclosure.

Referring to FIGS. 4, 5A, and/or 5B, the electronic device 101 may include a first housing 201, a second housing 202, a display assembly 230, and a driving structure 240. The configurations of the first housing 201, the second housing 202, and the display assembly 230 in FIGS. 4, 5A, and/or 5B may be wholly or partially identical to the configurations of the first housing 201, the second housing 202, and the display 203 in FIGS. 2 and/or 3.

According to various embodiments, the first housing 201 may include a first cover member 211 (e.g., the first cover member 211 in FIGS. 2 and 3), a frame 213, and a first rear plate 215.

According to various embodiments, the first cover member 211 may accommodate at least a portion of the frame 213, and may accommodate a component (e.g., a battery 289) positioned in the frame 213. According to one embodiment, the first cover member 211 may be formed to surround at least a portion of the second housing 202. According to an embodiment, a second circuit board 249 accommodating an electronic component (e.g., the processor 120 and/or the memory 130 in FIG. 1) may be connected to the first cover member 211.

According to various embodiments, the frame 213 may be connected to the first cover member 211. For example, the frame 213 may be connected to the first cover member 211, and the second housing 202 may move relative to the first cover member 211 and/or the frame 213. According to an embodiment, the frame 213 may accommodate a battery 289 (e.g., the battery 189 in FIG. 1). According to an embodiment, the frame 213 may include a curved portion 213a facing the display assembly 230.

According to various embodiments, the first rear plate 215 may substantially form at least a portion of the exterior of the first housing 201 or the electronic device 101. For example, the first rear plate 215 may be coupled to the outer surface of the first cover member 211. According to an embodiment, the first rear plate 215 may provide a decorative effect to the exterior of the electronic device 101. The first rear plate 215 may be manufactured using at least one of metal, glass, synthetic resin, or ceramic.

According to various embodiments, the second housing 202 may include a second cover member 221 (e.g., the second cover member 221 in FIGS. 2 and 3), a rear cover 223, and a second rear plate 225.

According to an embodiment, the second cover member 221 may be connected to the first housing 201 through a guide rail 250, and may reciprocate linearly in one direction (e.g., the direction of arrow ① in FIG. 3) while being guided by the guide rail 250.

According to various embodiments, the second cover member 221 may support at least a portion of the display 203. For example, the second cover member 221 may include a first surface F1, and a first display area A1 of the display 203 may be substantially positioned on the first surface F1 and maintain a flat plate shape. According to an embodiment, the second cover member 221 may be formed of a metal material and/or a non-metal (e.g., polymer) material. According to an embodiment, a first circuit board 248 accommodating an electronic component (e.g., the processor 120 and/or the memory 130 in FIG. 1) may be connected to the second cover member 221.

According to various embodiments, the rear cover 223 may protect a component (e.g., the first circuit board 248) positioned on the second cover member 221. For example, the rear cover 223 may be connected to the second cover member 221 and formed to surround at least a portion of the first circuit board 248. According to an embodiment, the rear cover 223 may include an antenna pattern for communicating with an external electronic device. For example, the rear cover 223 may include a laser direct structuring (LDS) antenna.

According to various embodiments, the second rear plate 225 may substantially form at least a portion of the exterior of the second housing 202 or the electronic device 101. For example, the second rear plate 225 may be coupled to the outer surface of the second cover member 221. According to one embodiment, the second rear plate 225 may provide a decorative effect to the exterior of the electronic device 101. The second rear plate 225 may be manufactured using at least one of metal, glass, synthetic resin, or ceramic.

According to various embodiments, the display assembly 230 may include a display 231 (e.g., the display 203 in FIGS. 2 and/or 3) and a multi-bar structure 232 supporting the display 231. According to an embodiment, the display 231 may be referred to as a flexible display, a foldable display, and/or a rollable display.

According to various embodiments, the multi-bar structure 232 may be connected or attached to at least a portion (e.g., a second display area A2) of the display 231. According to an embodiment, the multi-bar structure 232 may be moved relative to the first housing 201 by sliding of the second housing 202. When the electronic device 101 is in a closed state (e.g., the state of FIG. 2), the multi-bar structure 232 may be mostly accommodated in the first housing 201, and may be positioned between the first cover member 211 and the second cover member 221. According to an embodiment, at least a portion of the multi-bar structure 232 may move while corresponding to the curved surface 213a positioned at the edge of the frame 213. According to an embodiment, the multi-bar structure 232 may be referred to as a display support member or a support structure, and may have the form of one elastic plate.

According to various embodiments, the driving structure 240 may move the second housing 202 relative to the first housing 201. For example, the driving structure 240 may include a motor 241 configured to generate a driving force for sliding of the housings 201 and 202. The driving structure 240 may include a gear (e.g., a pinion) connected to the motor 241, and a rack 242 configured to mesh with the gear.

According to various embodiments, the housing in which the rack 242 is positioned may be different from the housing in which the motor 241 is positioned. According to an embodiment, the motor 241 may be connected to the second housing 202, and the rack 242 may be connected to the first housing 201. According to another embodiment, the motor 241 may be connected to the first housing 201, and the rack 242 may be connected to the second housing 202.

According to various embodiments, the first housing 201 may accommodate the first circuit board 248 (e.g., the main board). According to an embodiment, a processor (e.g., the processor 120 in FIG. 1), a memory (e.g., the memory 130 in FIG. 1), and/or an interface (e.g., the interface 177 in FIG. 1) may be mounted on the first circuit board 248. The processor may include, for example, one or more of a central processing unit, an application processor, a graphics processing unit, an image signal processor, a sensor hub processor, or a communication processor According to various embodiments, the first circuit board 248 may include a flexible printed circuit board type radio frequency cable (FRC). The first circuit board 248 may be disposed on at least a portion of the second cover member 221, and may be electrically connected to an antenna module (e.g., the antenna module 197 in FIG. 1) and a communication module (e.g., the communication module 190 in FIG. 1).

According to an embodiment, the memory may include, for example, volatile memory or non-volatile memory.

According to an embodiment, the interface may include, for example, a high-definition multimedia interface (HDMI), a universal serial bus (USB) interface, an SD card interface, and/or an audio interface. The interface may, for example, electrically or physically connect the electronic device 101 to an external electronic device, and may include a USB connector, an SD card/MMC connector, or an audio connector.

According to various embodiments, the electronic device 101 may include the second circuit board 249 (e.g., a sub-circuit board) spaced apart from the first circuit board 248 (e.g., a main circuit board) in the first housing 201. The second circuit board 249 may be electrically connected to the first circuit board 248 through a flexible connection substrate. The second circuit board 249 may be electrically connected to the battery 289 or electrical components disposed in an end area of the electronic device 101, such as a speaker and/or a sim socket, to transmit signals and power. According to an embodiment, the second circuit board 249 may accommodate a wireless charging antenna (e.g., a coil). For example, the battery 289 may receive power from an external electronic device by using the wireless charging antenna. In another example, the battery 289 may transmit power to an external electronic device by using the wireless charging antenna.

According to various embodiments, the battery 289 is a device for supplying power to at least one element of the electronic device 101, and may include a non-rechargeable primary cell, a rechargeable secondary cell, or a fuel cell. The battery 289 may be integrally disposed in the electronic device 101, and may be detachably disposed in the electronic device 101. According to an embodiment, the battery 289 may be formed as one integrated battery or may include multiple separate batteries. According to an embodiment, the battery 289 may be positioned in the frame 213, and the battery 289 may be slid together with the frame 213.

According to various embodiments, the guide rail 250 may guide the movement of the multi-bar structure 232. For example, the multi-bar structure 232 may slide along a slit 251 formed in the guide rail 250. According to an embodiment, the guide rail 250 may be connected to the first housing 201. For example, the guide rail 250 may be connected to the first cover member 211 and/or the frame 213. According to an embodiment, the slit 251 may be referred to as a groove or a recess formed in the inner surface of the guide rail 250.

According to various embodiments, the guide rail 250 may provide pressure to the multi-bar structure 232 based on the driving of the motor 241.

According to an embodiment, when the electronic device 101 is switched from a closed state to an opened state, the inner portion 252 of the guide rail 250 may provide pressure to the multi-bar structure 232. The multi-bar structure 232, provided with pressure, may move along the slit 251 of the guide rail 250, and the second housing 202 may switch from a slide-in state to a slide-out state with respect to the first housing 201. At least a portion of the display assembly 230 accommodated between the first cover member 211 and the frame 213 may be extended to the front surface.

According to an embodiment, when the electronic device 101 is switched from an opened state to a closed state, the outer portion 253 of the guide rail 250 may provide pressure to the bent multi-bar structure 232. The multi-bar structure 232 provided with pressure may move along the slit 251 of the guide rail 250, and the second housing 202 may switch from a slide-out state to a slide-in state with respect to the first housing 201. At least a portion of the display assembly 230 may be accommodated between the first cover member 211 and the frame 213.

Referring to FIG. 5A, when the electronic device 101 is in a closed state, at least a portion of the second housing 202 may be disposed to be accommodated in the first housing 201. As the second housing 202 is disposed to be accommodated in the first housing 201, the overall volume of the electronic device 101 may be reduced. According to an embodiment, when the second housing 202 is accommodated in the first housing 201, the size of the display 231 visually exposed may be reduced. For example, when the second housing 202 is fully accommodated in the first housing 201, the first display area A1 of the display 231 may be visually exposed, and the second display area A2 may not be visually exposed. At least a portion of the second display area A2 may be disposed between the battery 289 and the rear plates 215 and 225.

Referring to FIG. 5B, when the electronic device 101 is in an opened state, at least a portion of the second housing 202 may protrude from the first housing 201. When the second housing 202 protrudes from the first housing 201, the overall volume of the electronic device 101 may increase. According to an embodiment, when the second housing 202 protrudes from the first housing 201, at least a portion of the second display area A2 of the display 231 may be visually exposed to the outside of the electronic device 101 together with the first display area A1.

Figure 6:
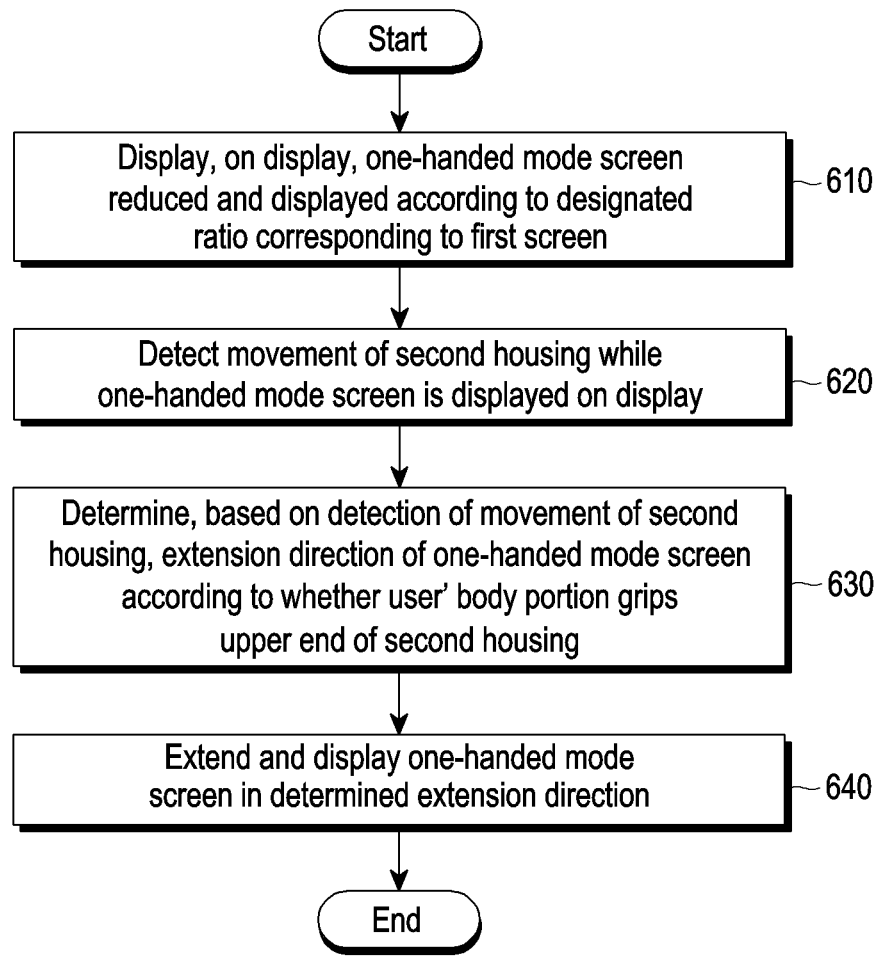
FIG. 6 is an illustrative flowchart illustrating functions or operations in which a property of a one-handed mode screen is changed depending on a grip type in which a user grips an electronic device when the state of an electronic device according to an embodiment herein is changed.

FIG. 6 is an illustrative flowchart illustrating functions or operations in which a property of a one-handed mode screen is changed depending on a grip type in which a user grips an electronic device when the state of an electronic device according to an embodiment herein is changed. In an embodiment, at least one of the operations described below may be electronically executed.

The embodiment illustrated in FIG. 6 is only one embodiment, and the order of operations according to various embodiments disclosed herein may be different from that illustrated in FIG. 6, and some operations illustrated in FIG. 6 may be omitted. Alternatively, the order thereof may be changed, or operations may be merged.

Figure 7A:
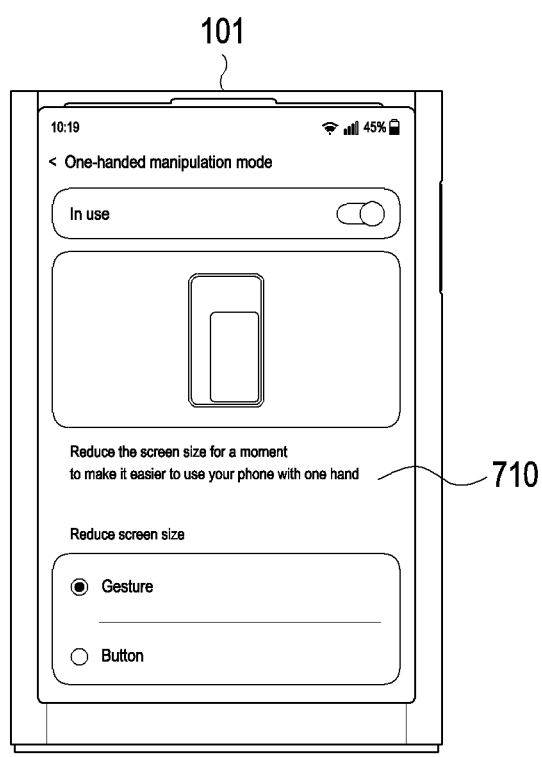
FIG. 7A is an exemplary view illustrating a screen for configuring a one-handed manipulation mode according to an embodiment herein.
Figure 7B:
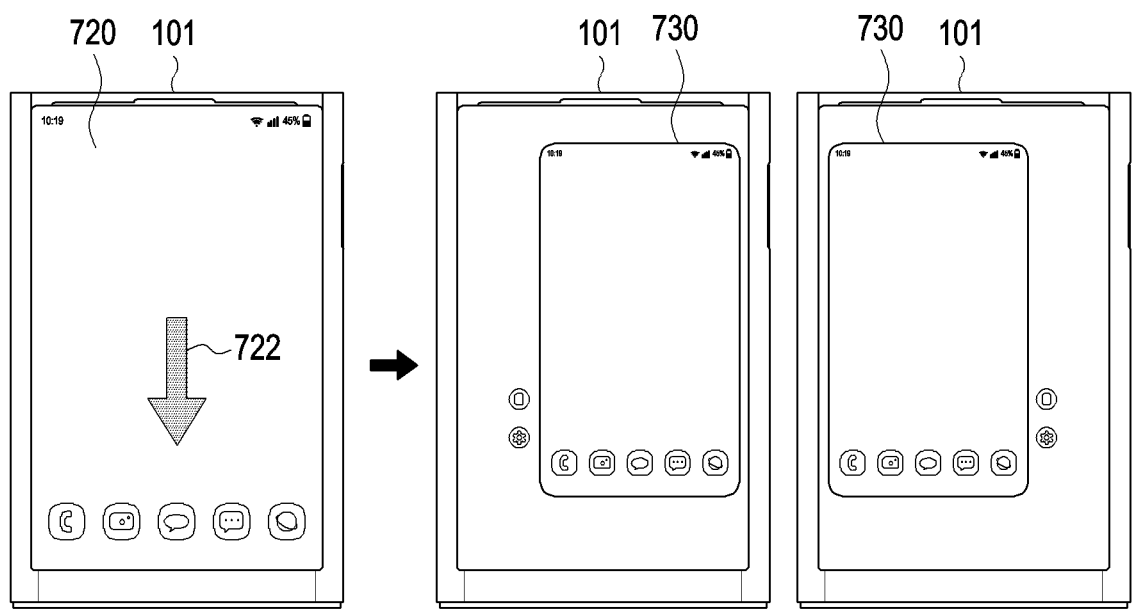
FIG. 7B is an exemplary view illustrating a function or operation of entering a one-handed manipulation mode according to a user gesture according to an embodiment herein.
Figure 7C:
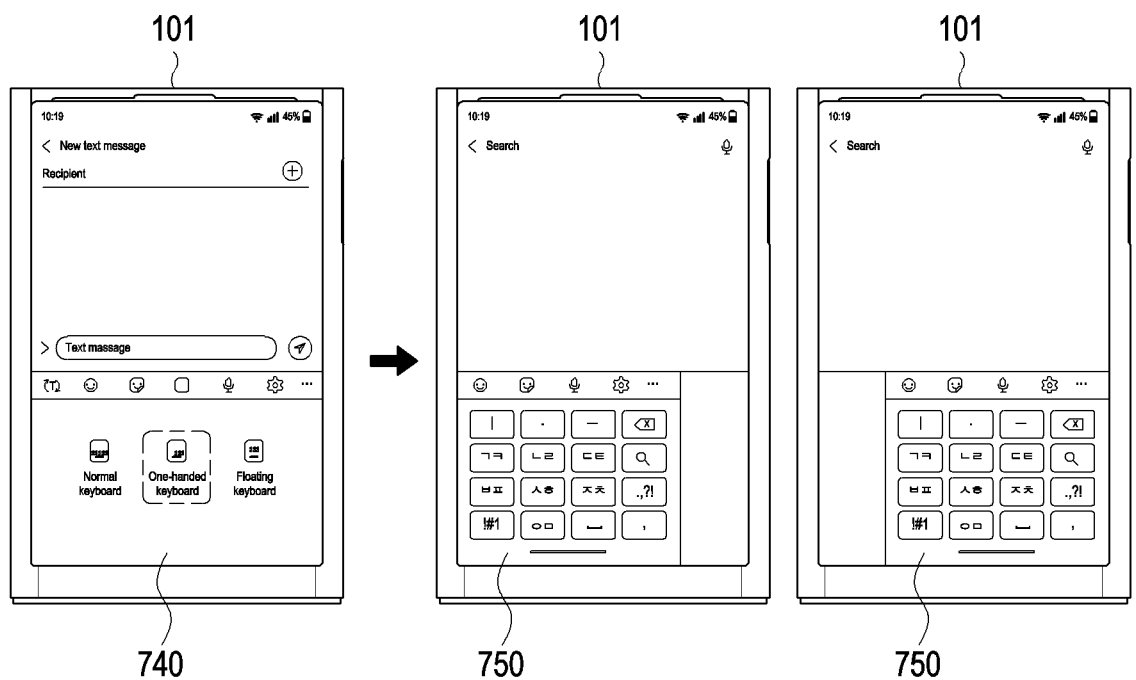
FIG. 7C is an exemplary view illustrating a function or operation of entering a one-handed manipulation mode according to a user's selection input for a visual object according to an embodiment herein.
Figure 8A:
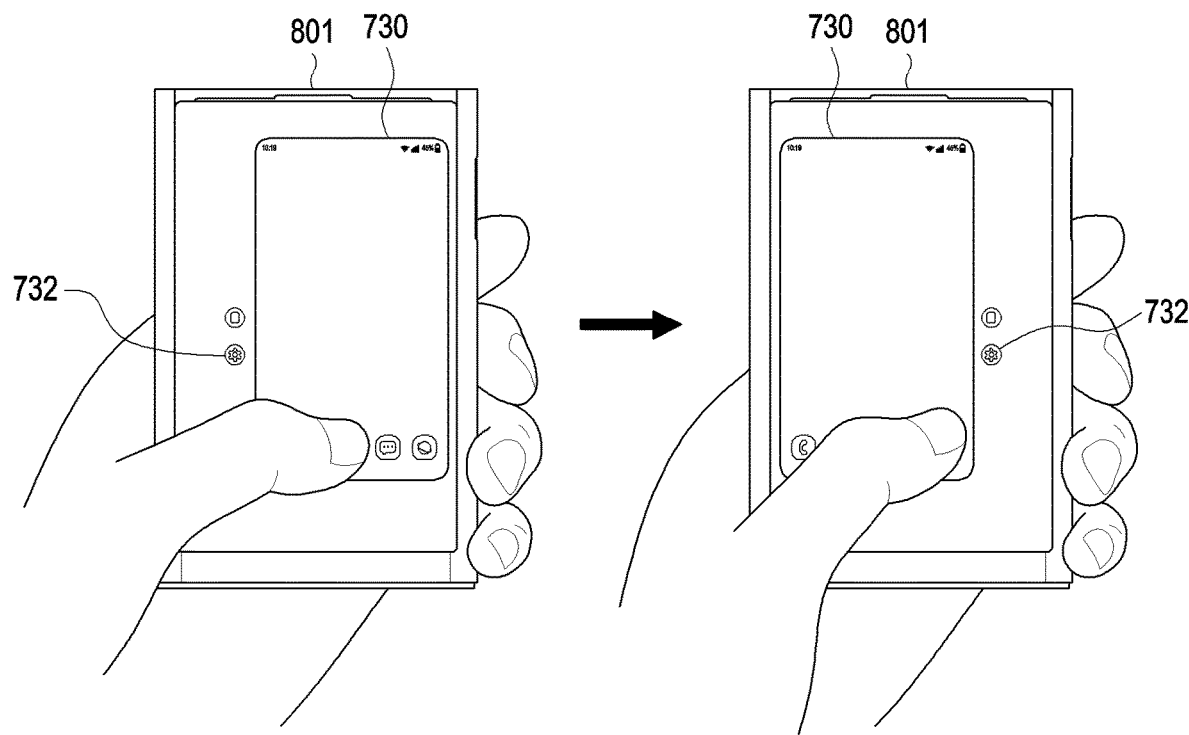
FIGS. 8A and 8B are exemplary views illustrating the art related to embodiments herein, in which a one-hand mode screen is displayed regardless of the type of a user's grip.
Figure 8B:
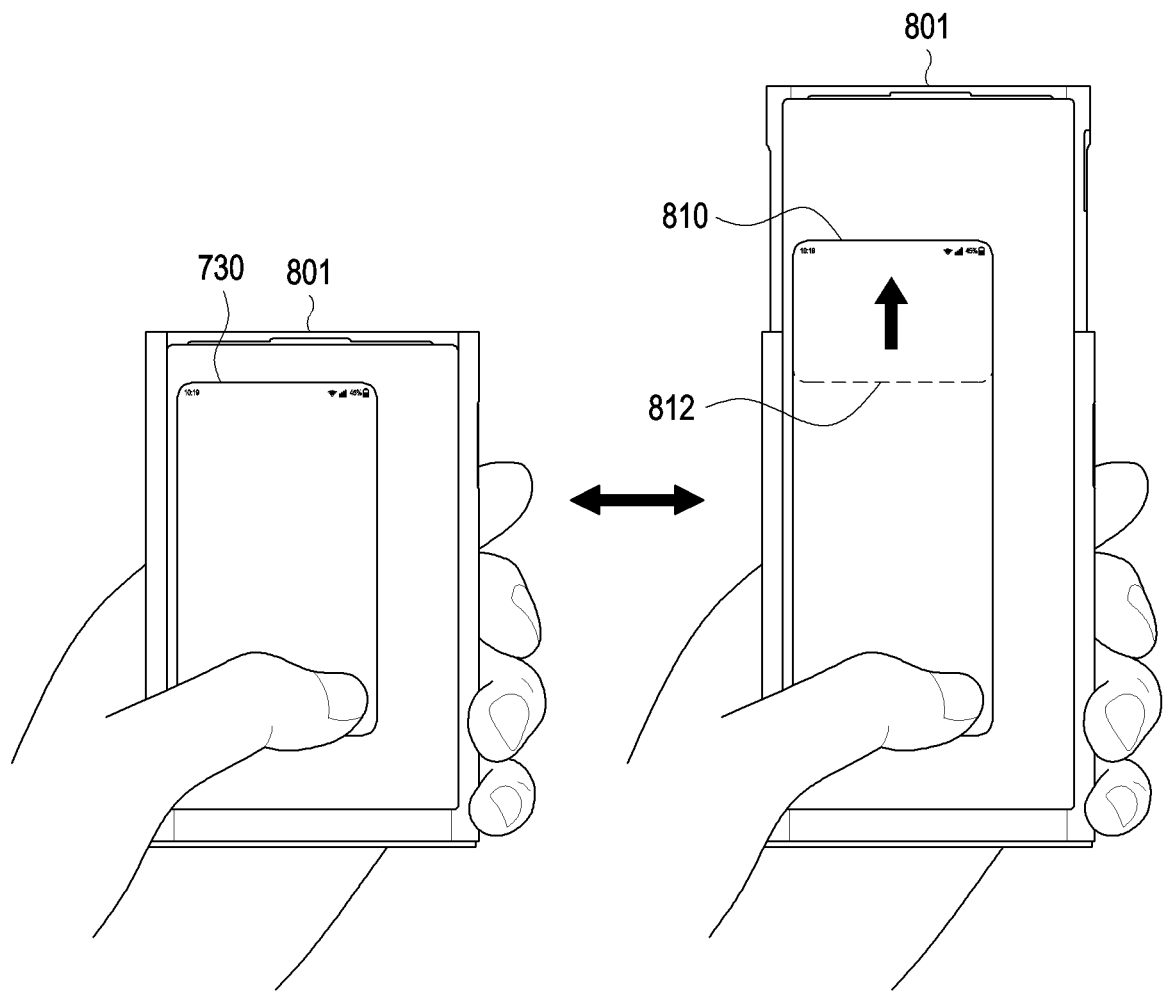

Referring to FIG. 6, in operation 610, the electronic device 101 according to an embodiment herein may display, on the display 203 (e.g., a flexible display), a one-handed mode screen that is reduced and displayed according to a predetermined ratio corresponding to a first screen (e.g., a home screen or an application execution screen). FIG. 7A is an exemplary view illustrating a screen (e.g., a first screen 710) for configuring a one-handed manipulation mode according to an embodiment herein. Referring to FIG. 7A, the electronic device 101 according to an embodiment herein may configure, through a user input on the screen (e.g., the first screen 710) for configuring a one-handed manipulation mode, whether to use the one-handed manipulation mode and a method for entering the one-handed manipulation mode (e.g., entry via gesture or entry via a specific button). FIG. 7B is an exemplary view illustrating a function or operation of entering a one-handed manipulation mode according to a user gesture according to an embodiment herein. FIG. 7C is an exemplary view illustrating a function or operation of entering a one-handed manipulation mode according to a user's selection input for a visual object according to an embodiment herein. Referring to FIG. 7B, the electronic device 101 according to an embodiment herein may enter a one-handed manipulation mode when detecting that a gesture 722 (e.g., a downward swipe gesture) that is designated by a user or predesignated is input. As illustrated in FIG. 7B, in response to entering the one-handed manipulation mode, the electronic device 101 according to an embodiment herein may reduce a specific screen, which is currently being displayed on the display 203, to a designated ratio, and may display the reduced screen on the display 203. As illustrated in FIG. 7B, the electronic device 101 according to an embodiment herein may display, on the display 203, the screen (e.g., a one-handed mode screen 730) reduced to the designated ratio to be biased in a specific direction (e.g., right or left). Referring to FIG. 7C, the electronic device 101 according to an embodiment herein may enter the one-handed manipulation mode through a menu related to a virtual keypad 750 of a designated application (e.g., a message application). When a selection input for a designated visual object (e.g., a "one-handed keyboard" icon) displayed on an execution screen (e.g., a second screen 740) of the designated application (e.g., the message application) is detected, the electronic device 101 according to an embodiment herein may display, on the display 203, the virtual keypad 750 having a size reduced according to a designated ratio. As illustrated in FIG. 7C, the electronic device 101 according to an embodiment herein may display, on the display 203, the virtual keypad 750 reduced to the designated ratio to be biased in a specific direction (e.g., right or left). However, according to the art related to various embodiments herein, in the one-handed manipulation mode, the one-handed mode screen (e.g., the reduced execution screen or the reduced virtual keypad) may be displayed at a position at which the same has been previously displayed. In other words, the one-handed mode screen may be displayed regardless of the type of the user's grip. FIGS. 8A and 8B are exemplary views illustrating the art related to embodiments herein, in which a one-hand mode screen is displayed regardless of the type of a user's grip. Referring to FIG. 8A, a mobile terminal 801 according to the art related to various embodiments herein may display a one-handed mode screen 730 reduced to be biased toward the right that is a position at which the one-handed mode screen has been previously displayed, even though a user grips the mobile terminal 801 with the left hand. In this case, for example, the user of the mobile terminal 801 may experience inconvenience of having to use the one-handed mode screen 730 after changing the position of the one-handed mode screen 730 in a setting menu through a setting icon 732. Alternatively, referring to FIG. 8B, in the mobile terminal 801 according to the art related to the embodiments herein, when the mobile terminal 801 is switched from a closed state to an opened state, the one-handed mode screen 730 is displayed while being extended in the upward direction even though the user grips the lower portion of the mobile terminal 801, and thus it may be difficult for the user of the mobile terminal 801 to control an extended one-handed mode screen area 812. Various embodiments herein may provide the electronic device 101 which may determine the display position or extension direction of the one-handed mode screen 730 according to the type of a user's grip, thereby reducing the user's discomfort and allowing the user to use a one-handed manipulation mode.

Figure 9A:
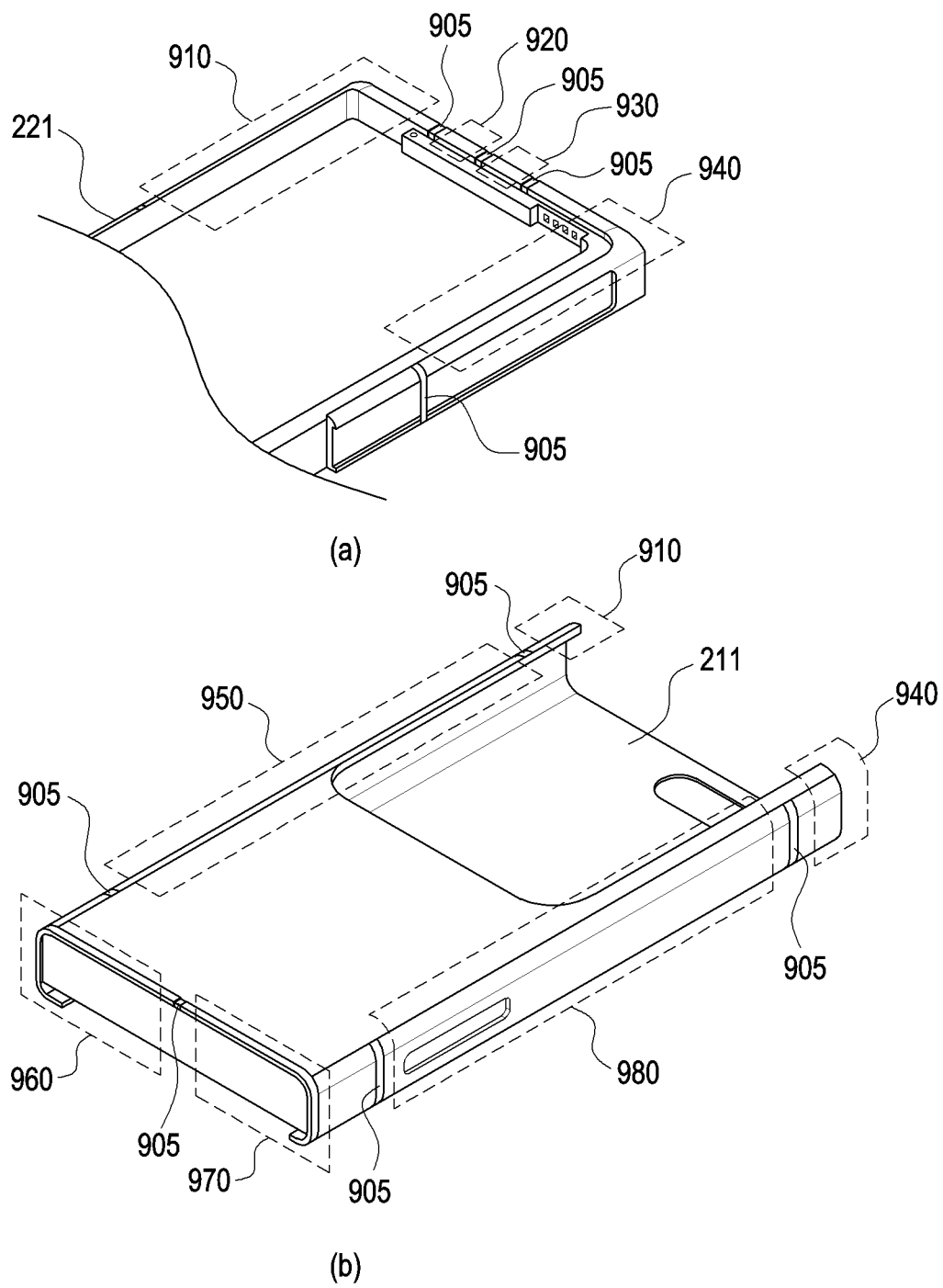
FIG. 9A is an exemplary view illustrating a grip sensing area according to an embodiment herein.
Figure 9B:
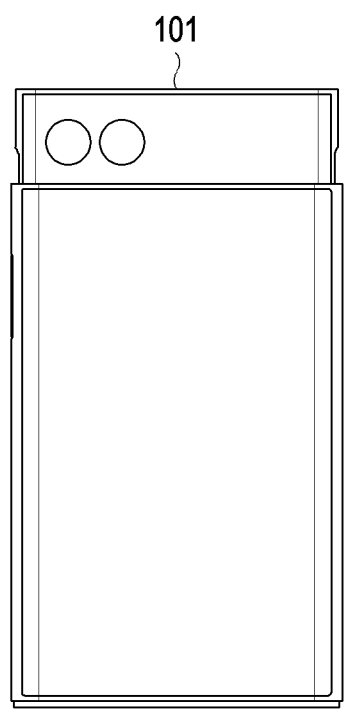
FIGS. 9B and 9C are exemplary views illustrating a grip sensing area of an electronic device according to another embodiment herein.
Figure 9C:
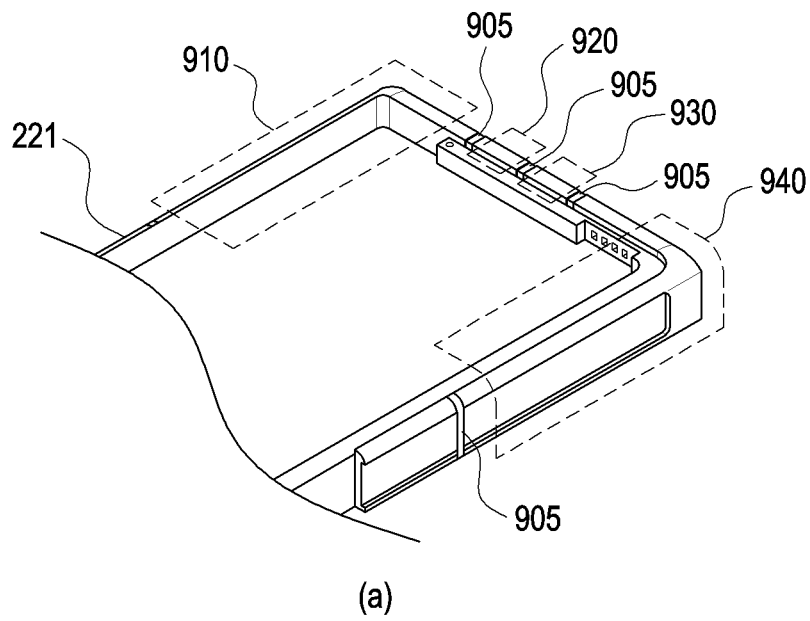
Figure 9C:
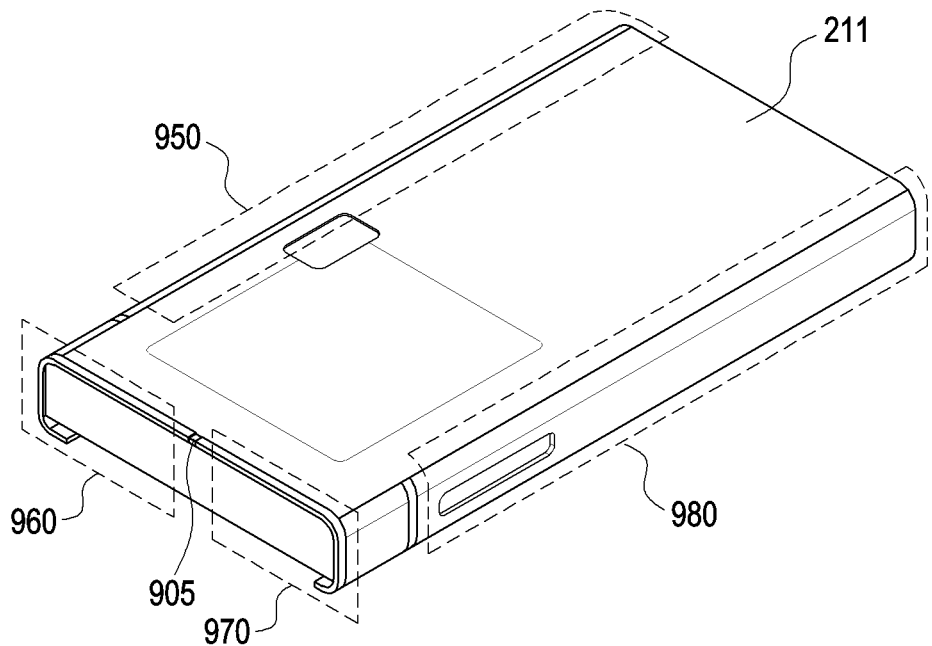

In operation 620, the electronic device 101 according to an embodiment herein may detect that the second housing 202 is moved while the one-handed mode screen 730 is displayed on the display 203. FIG. 9A is an exemplary view illustrating a grip sensing area (e.g., at least one among a first grip sensing area 910, a second grip sensing area 920, a third grip sensing area 930, a fourth grip sensing area 940, a fifth grip sensing area 950, a sixth grip sensing area 960, a seventh grip sensing area 970, and an eighth grip sensing area 980) according to an embodiment herein. According to a non-limiting exemplary embodiment, the first grip sensing area 910 may be located at an upper side portion of the second housing 202, that is, at an upper side portion of the second cover member 221. The fourth grip sensing area 940 may be located at an upper side portion of the second housing 202, that is opposed to the upper side portion where the first grip sensing area is located. The second grip sensing area 920 and the third grip sensing area 930 may be located at a central upper portion of the second housing 202, that is, at a central upper portion of the second cover member 221. The fifth grip sensing area 950 may be located at a first lateral portion of the first housing 201, that is, at a first lateral portion of the first cover member 211. The eighth grip sensing area 980 may be located at a second lateral portion of the first housing 201, that is opposite to the first lateral portion. The sixth grip sensing area 960 may be located at a lower end portion of the first housing 201. The seventh grip sensing area 970 may be located at a lower end portion of the first housing 201 opposed to the sixth grip sensing area 960. Referring to FIG. 9A, the electronic device 101 according to an embodiment herein may include a grip sensor. The grip sensor according to an embodiment herein may include a sensor for detecting proximity of a portion of a user's body in a capacitive manner. The grip sensor according to an embodiment herein may be provided in an area made of a metal material. The grip sensing area (e.g., at least one among the first grip sensing area 910, the second grip sensing area 920, the third grip sensing area 930, the fourth grip sensing area 940, the fifth grip sensing area 950, the sixth grip sensing area 960, the seventh grip sensing area 970, and the eighth grip sensing area 980) may include an area having a grip sensor. The grip sensing area (e.g., at least one among the first grip sensing area 910, the second grip sensing area 920, the third grip sensing area 930, the fourth grip sensing area 940, the fifth grip sensing area 950, the sixth grip sensing area 960, the seventh grip sensing area 970, and the eighth grip sensing area 980) according to an embodiment herein may be distinguished by, for example, metal segments 905. The grip sensor according to an embodiment herein may not be provided on the metal segments 905. As exemplarily illustrated in FIG. 9A, the grip sensor according to an embodiment herein may be provided on lateral metal portions of the first cover member 211 and the second cover member 221. FIGS. 9B and 9C are exemplary views illustrating a grip sensing area (e.g., at least one among a first grip sensing area 910, a second grip sensing area 920, a third grip sensing area 930, a fourth grip sensing area 940, a fifth grip sensing area 950, a sixth grip sensing area 960, a seventh grip sensing area 970, and an eighth grip sensing area 980) of an electronic device according to another embodiment herein. Referring to FIGS. 9B and 9C, a first cover member 211 of an electronic device 101 according to another embodiment herein may be formed to contact a second cover member 221 while covering a portion of the second cover member 221 without enclosing all of the second cover member 221. As exemplarily illustrated in FIG. 9C, the electronic device 101 according to another embodiment herein may include a grip sensing area (e.g., at least one among the first grip sensing area 910, the second grip sensing area 920, the third grip sensing area 930, the fourth grip sensing area 940, the fifth grip sensing area 950, the sixth grip sensing area 960, the seventh grip sensing area 970, and the eighth grip sensing area 980).

Figure 10A:
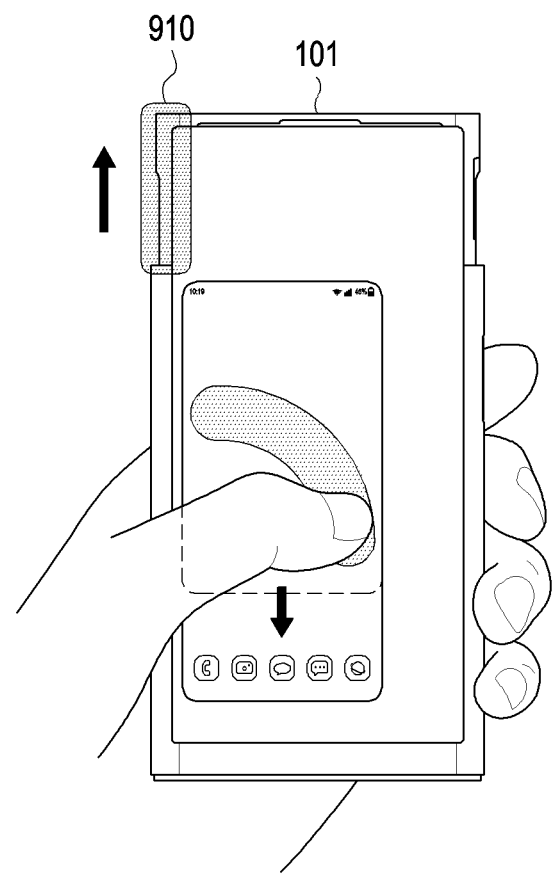
FIG. 10A is an exemplary view illustrating a function or operation in which the extension direction of a one-handed mode screen is determined based on a first grip type when an electronic device according to an embodiment herein is switched from a closed state to an opened state.

In operation 630, the electronic device 101 according to an embodiment herein may determine, based on the detection of the movement of the second housing 202, the direction of extension of the one-handed mode screen 730 according to whether a portion of the user's body grips the upper end (e.g., the first grip sensing area 910) of the second housing 202. In operation 640, the electronic device 101 according to an embodiment herein may extend and display the one-handed mode screen 730 according to the extension direction determined in operation 630. FIG. 10A is an exemplary view illustrating a function or operation in which the extension direction of the one-handed mode screen 730 is determined based on a first grip type when the electronic device 101 according to an embodiment herein is switched from a closed state to an opened state. Referring to FIG. 10A, the user of the electronic device 101 according to an embodiment herein may not grip the upper end (e.g., an area including at least a portion of the first grip sensing area 910) of the electronic device 101. Herein, for convenience of description, the state in which the user does not grip the upper end (e.g., the area including at least a portion of the first grip sensing area 910) of the electronic device 101 may be referred to as a "first grip type". When the user grips the electronic device 101 in the first grip type, the electronic device 101 according to an embodiment herein may display the one-handed mode screen 730 on the display 203 while extending the one-handed mode screen 730 downward as illustrated in FIG. 10A. The extended one-handed mode screen 730 according to an embodiment herein may include a screen newly displayed on the display 203 according to the expansion of the display 203. The first grip type according to an embodiment herein may include, for example, a grip type in which the user's grip is detected in an area including the fifth grip sensing area 950 and the sixth grip sensing area 960, but the user's grip is not detected in the first grip sensing area 910. In the first grip type according to an embodiment herein, the extension direction of the electronic device 101 and the extension direction of the one-handed mode screen 730 may be opposite to each other.

Figure 10B:
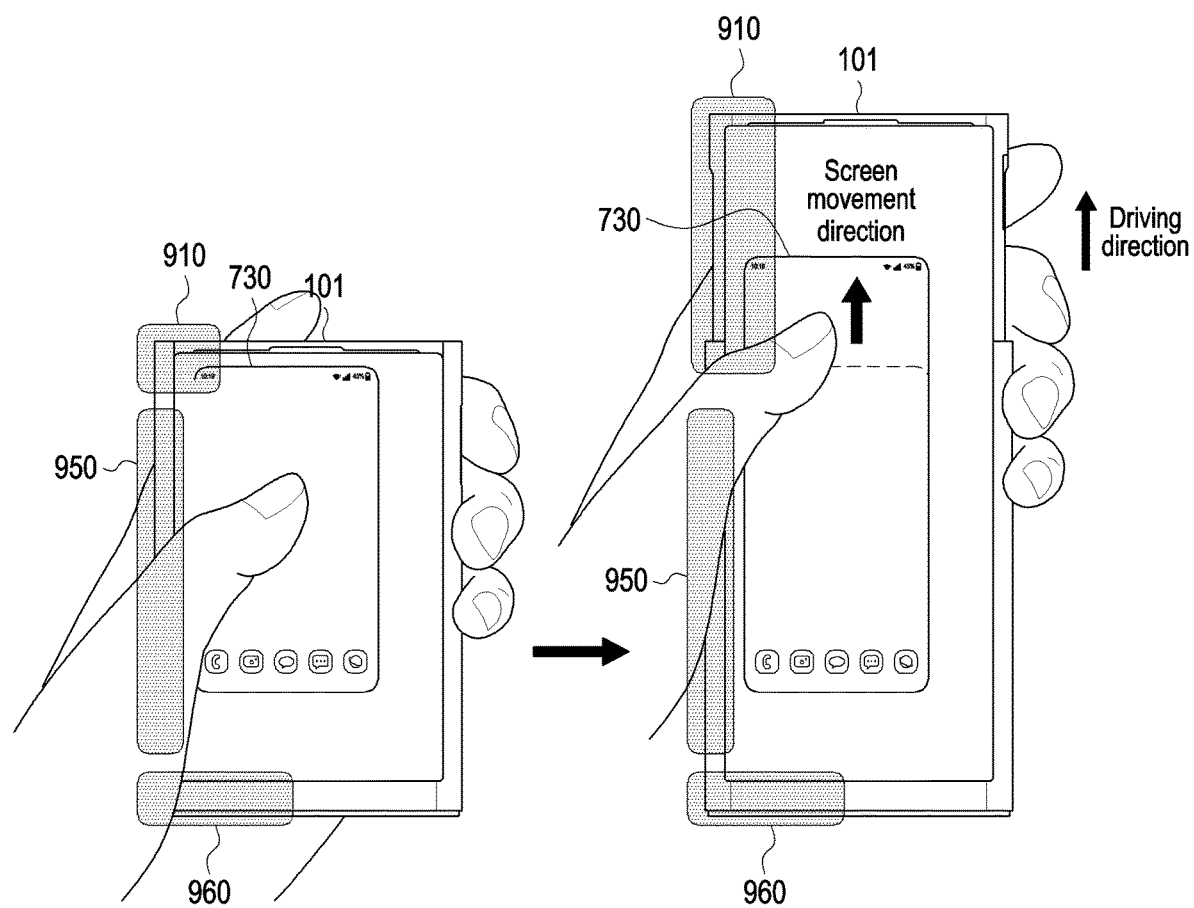
FIG. 10B is an exemplary view illustrating a function or operation in which the extension direction of a one-handed mode screen is determined based on a second grip type when an electronic device according to an embodiment herein is switched from a closed state to an opened state.

FIG. 10B is an exemplary view illustrating a function or operation in which the extension direction of a one-handed mode screen is determined based on a second grip type when an electronic device according to an embodiment herein is switched from a closed state to an opened state. Referring to FIG. 10B, a user of the electronic device 101 according to an embodiment herein may be gripping the upper end (e.g., an area including at least a portion of the first grip sensing area 910) of the electronic device 101. Herein, for convenience of description, the state in which the user grips the upper end (e.g., the area including at least a portion of the first grip sensing area 910) of the electronic device 101 may be referred to as a "second grip type". When the user grips the electronic device 101 in the second grip type, the electronic device 101 according to an embodiment herein may display the one-handed mode screen 730 on the display 203 while extending the one-handed mode screen 730 upward as illustrated in FIG. 10B. The extended one-handed mode screen 730 according to an embodiment herein may include a screen newly displayed on the display 203 according to the extension of the display 203. The second grip type according to an embodiment herein may include, for example, a grip type in which the user's grip is detected in an area including the first grip sensing area 910, the fifth grip sensing area 950, and the sixth grip sensing area 960. In the second grip type according to an embodiment herein, the extension direction of the electronic device 101 and the extension direction of the one-handed mode screen 730 may be identical to each other. The display position of the one-handed mode screen 730 (e.g., the upper or lower end of the one-handed mode screen 730) according to an embodiment herein may be maintained while the one-handed mode screen 730 is extended. In other words, the display position of the one-handed mode screen 730 may be moved by the extension of the display 203, and thus it may appear to the user that the display position of the one-handed mode screen 730 is maintained despite the extension of the display 203.

Figure 11A:
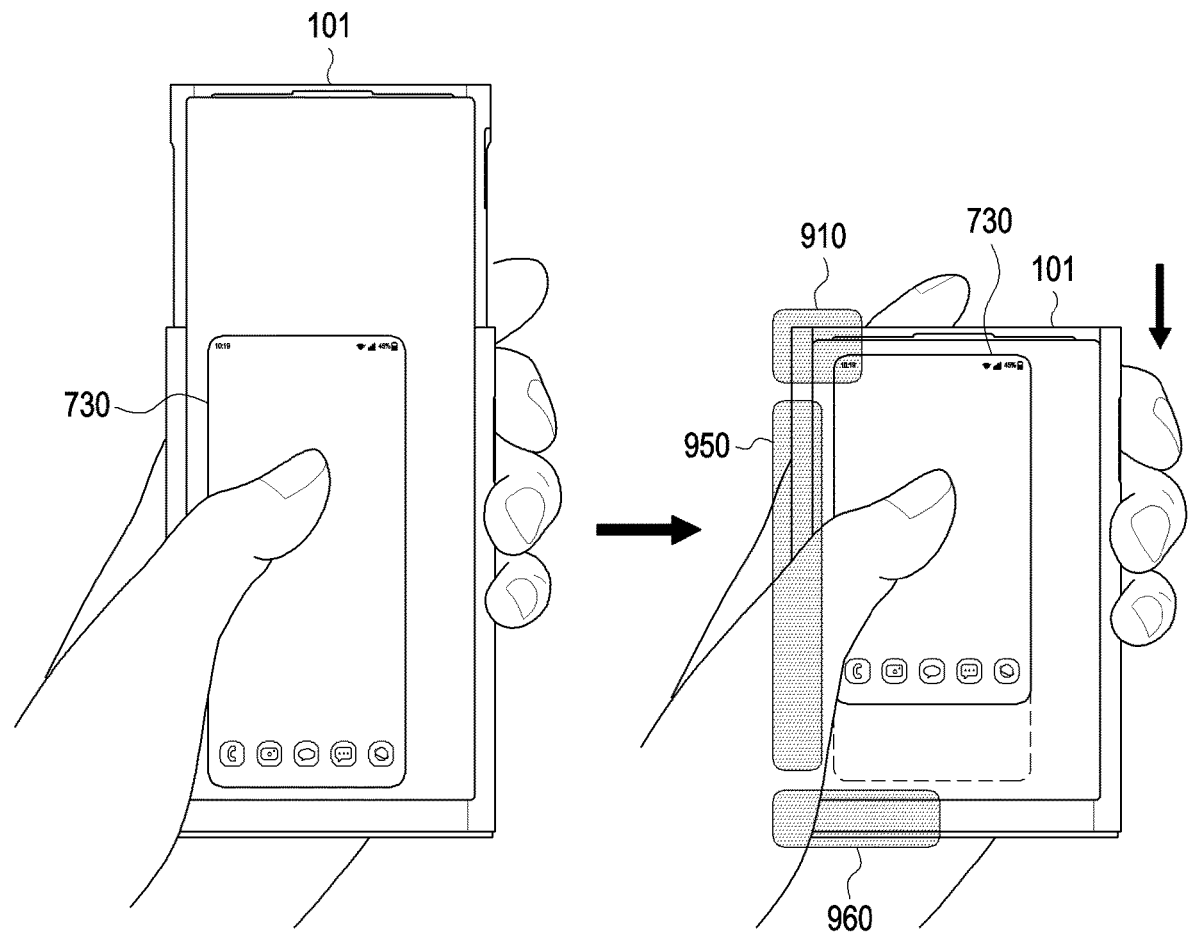
FIG. 11A is an exemplary view illustrating a function or operation in which the extension direction of a one-handed mode screen is determined based on a first grip type when an electronic device according to an embodiment herein is switched from an opened state to a closed state.
Figure 11B:
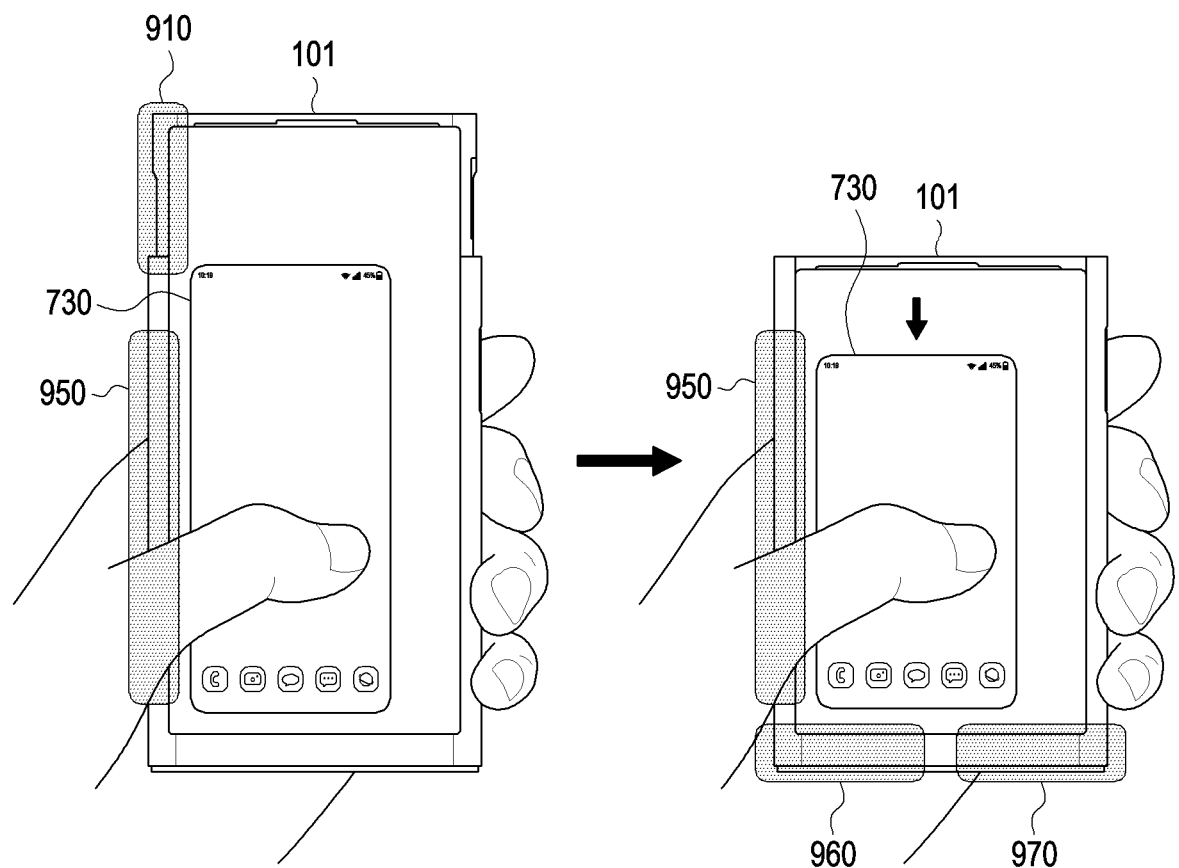
FIG. 11B is an exemplary view illustrating a function or operation in which the extension direction of a one-handed mode screen is determined based on a second grip type when an electronic device according to an embodiment herein is switched from an opened state to a closed state.

FIG. 11A is an exemplary view illustrating a function or operation in which the extension direction of a one-handed mode screen 730 is determined based on a second grip type when an electronic device 101 according to an embodiment herein is switched from an opened state to a closed state. Referring to FIG. 11A, when the type of a user's grip on the electronic device 101 is a second grip type and when the electronic device 101 is switched from the opened state to the closed state, the electronic device 101 according to an embodiment herein may display the one-handed mode screen 730 on the display 203 while reducing the one-handed mode screen 730 in a direction opposite to the driving direction of the electronic device 101. FIG. 11B is an exemplary view illustrating a function or operation in which the extension direction of the one-handed mode screen 730 is determined based on a first grip type when the electronic device 101 according to an embodiment herein is switched from an opened state to a closed state. Referring to FIG. 11B, when the type of a user's grip on the electronic device 101 is a first grip type and when the electronic device 101 is switched from the opened state to the closed state, the electronic device 101 according to an embodiment herein may display the one-handed mode screen 730 on the display 203 while reducing the one-handed mode screen 730 in a direction (e.g., a downward direction) identical to the driving direction of the electronic device 101. The display position of the one-handed mode screen 730 (e.g., the upper or lower end of the one-handed mode screen 730) according to an embodiment herein may be maintained while the one-handed mode screen 730 is reduced. In other words, the display position of the one-handed mode screen 730 may be moved by the reduction of the display 203, and thus it may appear to the user that the display position of the one-handed mode screen 730 is maintained despite the reduction of the display 203.

Figure 12:
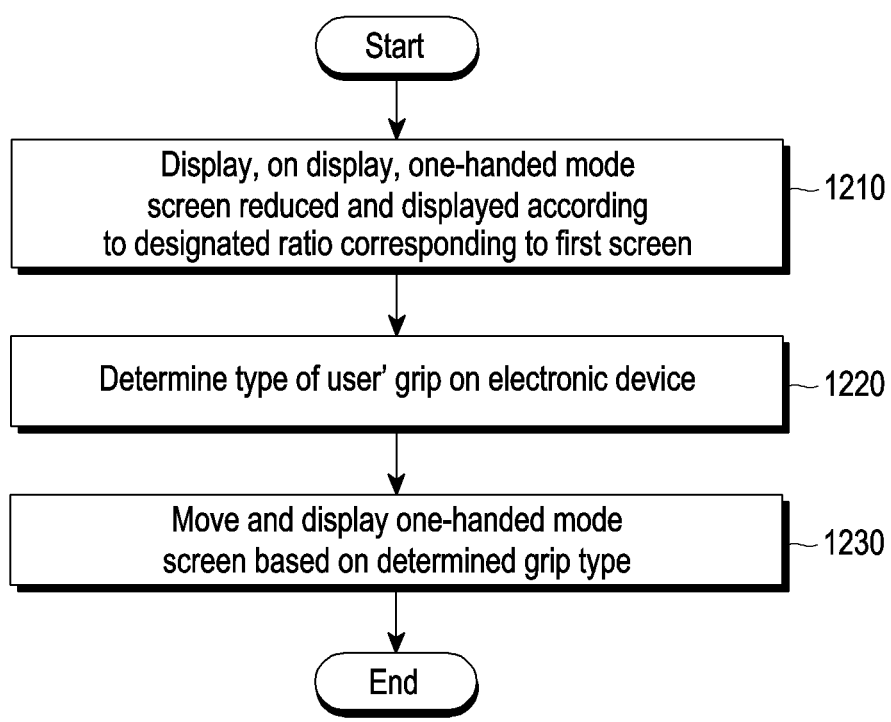
FIG. 12 is an exemplary flowchart illustrating a function or operation in which a one-handed mode screen is moved and displayed according to the type of a user's grip when an electronic device according to an embodiment herein is in a closed state.
Figure 13A:
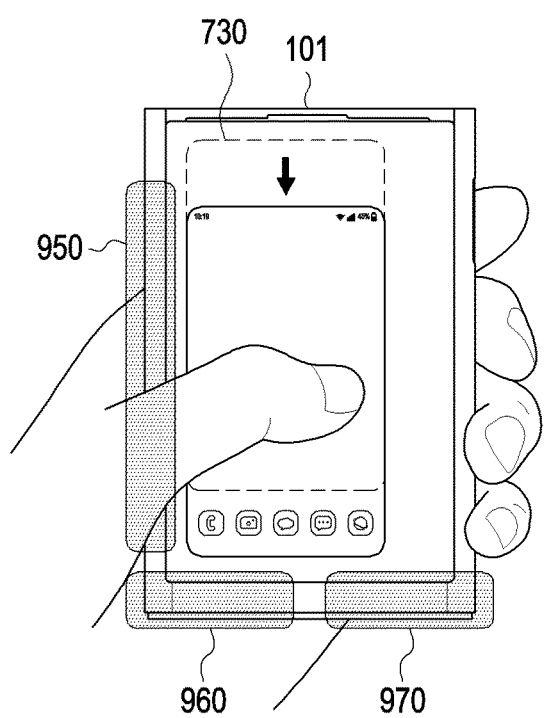
FIGS. 13A, 13B, and 13C are exemplary views illustrating the function or operation exemplarily described in FIG. 12 in terms of a user interface.
Figure 13B:
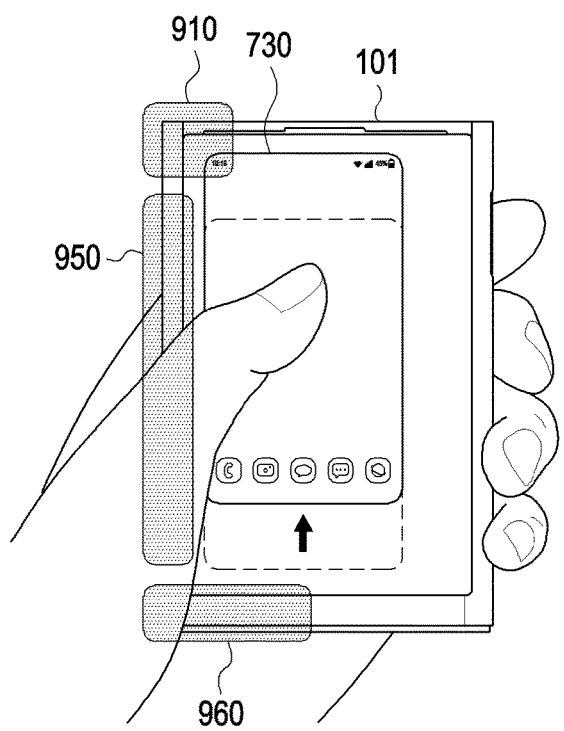
Figure 13C:
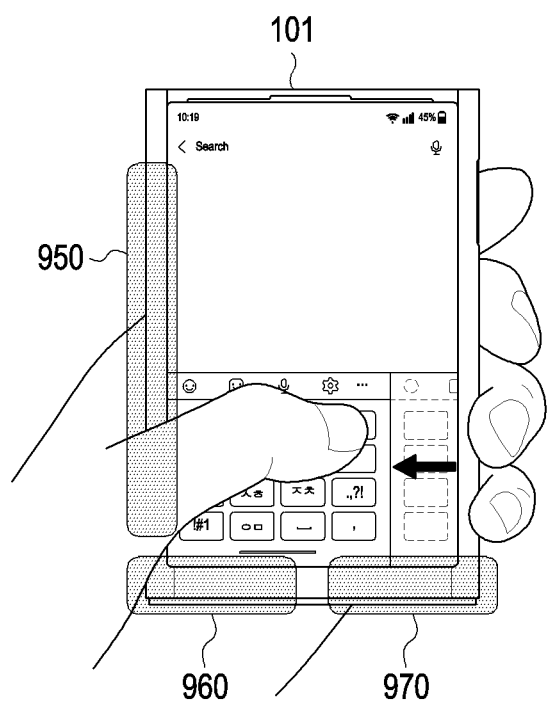

FIG. 12 is an exemplary flowchart illustrating a function or operation in which a one-handed mode screen 730 is moved and displayed according to the type of a user's grip when the electronic device 101 according to an embodiment herein is in a closed state. FIGS. 13A to 13C are exemplary views illustrating the function or operation exemplarily described in FIG. 12 in terms of a user interface.

In an embodiment, at least one of the operations to be described below may be executed by the processor 120 of the electronic device 101.

The embodiment illustrated in FIG. 12 is only one embodiment, and the order of operations according to various embodiments disclosed herein may be different from that illustrated in FIG. 12. Some operations illustrated in FIG. 12 may be omitted, the order of the operations may be changed, or the operations may be merged.

Referring to FIG. 12, in operation 1210, the electronic device 101 according to an embodiment herein may display, on the display 203 (e.g., a flexible display), a one-handed mode screen that is reduced and displayed according to a designated ratio corresponding to a first screen (e.g., a home screen or an application execution screen). As illustrated in FIG. 13A, the electronic device 101 according to an embodiment herein may display the one-handed mode screen 730 on the display 203

In operation 1220, the electronic device 101 according to an embodiment herein may determine the type of a user's grip. The electronic device 101 according to an embodiment herein may determine, based on a value sensed by a grip sensor, whether the type of the user's grip is a first grip type or a second grip type.

In operation 1230, the electronic device 101 according to an embodiment herein may move and display the one-handed mode screen 730, based on the grip type determined in operation 1220. Referring to FIG. 13A, when it is determined that the type of the user's grip on the electronic device 101 is the first grip type, the electronic device 101 according to an embodiment herein may move a display position of the one-handed mode screen 730 from a first position (e.g., a position where the one-handed mode screen 730 was last displayed at the end of the previous one-handed mode) to a designated second position (e.g., a position below the first position). Alternatively, referring to FIG. 13B, when it is determined that the type of the user's grip on the electronic device 101 is the second grip type, the electronic device 101 according to an embodiment herein may move the display position of the one-handed mode screen 730 from a third position (e.g., a position where the one-handed mode screen 730 was last displayed at the end of the previous one-handed mode) to a designated fourth position (e.g., a position above the third position). Referring to FIG. 13C, when it is determined that the type of the user's grip on the electronic device 101 is the first grip type, the electronic device 101 according to an embodiment herein may move the display position of the one-handed mode screen 730 from a fifth position (e.g., a position where the one-handed mode screen 730 was last displayed at the end of the previous one-handed mode) to a designated sixth position (e.g., a position to the left of the first position) depending on the type of hand (e.g., the left hand) gripping the electronic device 101. The electronic device 101 according to an embodiment herein may determine whether a user's hand gripping the electronic device 101 is a left hand or a right hand, by using a pattern of sensing data sensed by the grip sensor. For example, the electronic device 101 according to an embodiment herein may compare the similarities between the pattern of predetermined sensing data and the pattern of the sensing data sensed by the grip sensor to determine whether the user's hand gripping the electronic device 101 is a left hand or a right hand.

According to another embodiment herein, operation 1220 may be performed before operation 1210. For example, the electronic device 101 according to an embodiment herein may determine a display position of the one-handed mode screen 730 after determining the type of the user's grip, and may then display the one-handed mode screen 730 in the determined display position.

An electronic device (e.g., the electronic device 101 in FIG. 1) according to an embodiment herein may include a first housing (e.g., the first housing 201 in FIG. 2A), a second housing (e.g., the second housing 202 in FIG. 2) disposed to be movable relative to the first housing, at least one processor (e.g., the processor 120 in FIG. 1) disposed in the first housing or the second housing, grip sensors respectively disposed on edges of the first housing and the second housing, and a flexible display (e.g., the display 160 in FIG. 1) at least partially mounted to the surface of the second housing and at least partially exposed to the outside of the electronic device, wherein a portion of the flexible display is inserted into or withdrawn from the first housing depending on sliding of the second housing, and at least one processor is configured to display, on the flexible display, a one-handed mode screen (e.g., the one-handed mode screen 730 in FIG. 10B) that is reduced and displayed according to a designated ratio corresponding to a first screen, detect that the second housing is moved while the one-handed mode screen is displayed, and determine, based on the detection of the movement of the second housing, an extension direction of the one-handed mode screen according to whether a first grip sensor, disposed at the edge of the first housing, among the grip sensors senses that a portion of the user's body grips the upper end of the first housing.

According to embodiment of the disclosure, the at least one processor may be further configured to extend and display the one-handed mode screen in a direction corresponding to an extension direction of the first housing when an upper end of the first housing is determined to be gripped.

The at least one processor may be further configured to extend and display the one-handed mode screen in a direction opposite to the extension direction of the first housing when the upper end of the first housing is determined not to be gripped.

The at least one processor may be further configured to display the one-handed mode screen on a first designated area of the flexible display when the upper end of the first housing is determined, through a first grip sensor, to be gripped while the electronic device is in a closed state.

The at least one processor may be further configured to display the one-handed mode screen on a second designated area of the flexible display when the upper end of the first housing is determined, through the first grip sensor, not to be gripped while the electronic device is in the closed state.

The first area may be positioned above the second area.

The at least one processor ma be further configured to move and display a display position of the one-handed mode screen from a currently displayed position to a position close to the upper end when a grip on the upper end is determined to have been sensed while the electronic device is in the closed state.

The at least one processor may be further configured to move and display a display position of the one-handed mode screen from a currently displayed position to a position close to a lower end opposite to the upper end when a grip on the upper end is determined not to have been sensed while the electronic device is in the closed state.

The at least one processor may be further configured to move and display the one-handed mode screen from a currently displayed position to a specified position depending on whether the user's hand gripping the electronic device is a left hand or a right hand when the type of grip on the electronic device is identified as a first grip type while the electronic device is in the closed state.

The one-handed mode screen may comprise a screen having a size smaller than a size of at least one virtual keypad or the flexible display exposed through the electronic device.

According to embodiment of the disclosure, the method may further comprise extending and displaying the one-handed mode screen in a direction corresponding to an extension direction of the first housing when an upper end of the first housing is determined to be gripped.

The method may further comprise extending and displaying the one-handed mode screen in a direction opposite to the extension direction of the first housing when the upper end of the first housing is determined not to be gripped.

The method may further comprise displaying the one-handed mode screen on a first designated area of the flexible display when the upper end of the first housing is determined, through a first grip sensor, to be gripped while the electronic device is in a closed state.

The method may further comprise displaying the one-handed mode screen on a second designated area of the flexible display when the upper end of the first housing is determined, through the first grip sensor, not to be gripped while the electronic device is in the closed state.

The first area may be positioned above the second area.

The method may further comprise moving and displaying a display position of the one-handed mode screen from a currently displayed position to a position close to the upper end when a grip on the upper end is determined to have been sensed while the electronic device is in the closed state.

The method may further comprise moving and displaying a display position of the one-handed mode screen from a currently displayed position to a position close to a lower end opposite to the upper end when a grip on the upper end is determined not to have been sensed while the electronic device is in the closed state.

The method may further comprise moving and displaying the one-handed mode screen from a currently displayed position to a specified position depending on whether the user's hand gripping the electronic device is a left hand or a right hand when the type of grip on the electronic device is identified as a first grip type while the electronic device is in the closed state.

The one-handed mode screen may comprise a screen having a size smaller than a size of at least one virtual keypad or the flexible display exposed through the electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment of the disclosure, each component (e.g., a module or a program) of the above-described components may include a single entity or multiple entities, and some of the multiple entities may be separately disposed in different components. According to an embodiment of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment of the disclosure, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a first housing;
a second housing disposed to be movable with respect to the first housing;
at least one grip sensor positioned on at least one edge of both the first housing and the second housing;
a flexible display at least partially mounted on a surface of the second housing and adapted to be inserted into or withdrawn from the first housing through slide-in or slide-out movement of the second housing; and
at least one processor operably connected to the first housing, the second housing, the at least one grip sensor, and the flexible display,
memory storing instructions that, when executed by the at least one processor, cause the electronic device to:
 display, on the flexible display, a one-handed mode screen that is reduced in size according to a specified ratio corresponding to the full screen in a slide-in state,
 detect that the second housing is moved while the one-handed mode screen is displayed,
 detect a grip state of a user holding the electronic device, and
 move a display position of the one-handed mode screen based on the detected grip state of the user.

2. The electronic device of claim 1, wherein the instructions, when executed by the at least one processor, further cause the electronic device to extend and display the one-handed mode screen in a direction corresponding to an extension direction of the first housing when an upper end of the first housing is determined to be gripped.

3. The electronic device of claim 1, wherein the instructions, when executed by the at least one processor, further cause the electronic device to extend and display the one-handed mode screen in a direction opposite to an extension direction of the first housing when an upper end of the first housing is determined not to be gripped.

4. The electronic device of claim 1, wherein the instructions, when executed by the at least one processor, further cause the electronic device to display the one-handed mode screen on a first designated area of the flexible display when an upper end of the first housing is determined, through a first grip sensor, to be gripped while the electronic device is in a closed state.

5. The electronic device of claim 4, wherein the instructions, when executed by the at least one processor, further cause the electronic device to display the one-handed mode screen on a second designated area of the flexible display when the upper end of the first housing is determined, through the first grip sensor, not to be gripped while the electronic device is in the closed state.

6. The electronic device of claim 5, wherein the first designated area is positioned above the second designated area.

7. The electronic device of claim 1, wherein the instructions, when executed by the at least one processor, further cause the electronic device to move and display a display position of the one-handed mode screen from a currently displayed position to a position close to an upper end when a grip on the upper end is determined to have been sensed while the electronic device is in a closed state.

8. The electronic device of claim 1, wherein the instructions, when executed by the at least one processor, further cause the electronic device to move and display a display position of the one-handed mode screen from a currently displayed position to a position close to a lower end opposite to an upper end when a grip on the upper end is determined not to have been sensed while the electronic device is in a closed state.

9. The electronic device of claim 1, wherein the instructions, when executed by the at least one processor, further cause the electronic device to move and display the one-handed mode screen from a currently displayed position to a specified position depending on whether a user's hand gripping the electronic device is a left hand or a right hand when a type of grip on the electronic device is identified as a first grip type while the electronic device is in a closed state.

10. The electronic device of claim 1, wherein the one-handed mode screen comprises a screen having a size smaller than a size of at least one virtual keypad or the flexible display exposed through the electronic device.

11. A method for controlling an electronic device, the method comprising:
   displaying, on a flexible display, a one-handed mode screen that is reduced in size according to a predetermined ratio corresponding to the full screen in a slide-in state;
   detecting that a second housing is moved while the one-handed mode screen is displayed;
   detecting a grip state of a user holding on the electronic device; and
   moving a display position of the one-handed mode screen based on the detected grip state of the user.

12. The method of claim 11, further comprising extending and displaying the one-handed mode screen in a direction corresponding to an extension direction of a first housing when an upper end of the first housing is determined to be gripped.

13. The method of claim 11, further comprising extending and displaying the one-handed mode screen in a direction opposite to an extension direction of a first housing when an upper end of the first housing is determined not to be gripped.

14. The method of claim 11, further comprising displaying the one-handed mode screen on a first designated area of the flexible display when an upper end of a first housing is determined, through a first grip sensor, to be gripped while the electronic device is in a closed state.

15. The method of claim 14, further comprising displaying the one-handed mode screen on a second designated area of the flexible display when the upper end of the first housing is determined, through the first grip sensor, not to be gripped while the electronic device is in the closed state.

* * * * *